US012494159B2

(12) United States Patent
Wu et al.

(10) Patent No.: US 12,494,159 B2
(45) Date of Patent: Dec. 9, 2025

(54) PIXEL CIRCUIT, CURRENT SOURCE CIRCUIT AND DISPLAY MODULE

(71) Applicant: Shanghai Tianma Micro-electronics Co., Ltd., Shanghai (CN)

(72) Inventors: Hao Wu, Shanghai (CN); Qijun Yao, Shanghai (CN)

(73) Assignee: Shanghai Tianma Micro-electronics Co., Ltd., Shanghai (CN)

( * ) Notice: Subject to any disclaimer, the term of this patent is extended or adjusted under 35 U.S.C. 154(b) by 0 days.

(21) Appl. No.: 18/610,409

(22) Filed: Mar. 20, 2024

(65) Prior Publication Data

US 2025/0157391 A1 May 15, 2025

(30) Foreign Application Priority Data

Nov. 13, 2023 (CN) ......................... 202311507685.4

(51) Int. Cl.
*G09G 3/30* (2006.01)
*G09G 3/32* (2016.01)

(52) U.S. Cl.
CPC ....... *G09G 3/32* (2013.01); *G09G 2300/0842* (2013.01); *G09G 2310/061* (2013.01); *G09G 2310/08* (2013.01); *G09G 2320/0233* (2013.01); *G09G 2330/021* (2013.01)

(58) Field of Classification Search
CPC ......... G09G 3/30–3291; G09G 3/3685; G09G 3/3688
See application file for complete search history.

(56) References Cited

U.S. PATENT DOCUMENTS

2006/0139343 A1* 6/2006 Choi .................... G09G 3/3275 345/204
2008/0180463 A1* 7/2008 Ogura .................... G09G 3/325 345/690
2017/0270867 A1* 9/2017 Zhu ...................... G09G 3/3233
2018/0357966 A1* 12/2018 Ma ....................... G09G 3/3233
2019/0147786 A1* 5/2019 Kim ...................... H10K 59/35 345/690
2020/0380920 A1* 12/2020 Lee ...................... G09G 3/3291
2022/0208120 A1* 6/2022 Liu ...................... G09G 3/3283
2022/0406257 A1* 12/2022 Gu ....................... G09G 3/3241
2023/0170900 A1* 6/2023 Hashimoto .............. G09G 3/32 345/204

FOREIGN PATENT DOCUMENTS

CN 104637446 A 5/2015

* cited by examiner

*Primary Examiner* — Roy P Rabindranath
(74) *Attorney, Agent, or Firm* — Anova Law Group, PLLC

(57) ABSTRACT

Pixel circuit, current source circuit and display module are provided. The pixel circuit includes a first driving branch and a data writing module. The first driving branch, connected to a light-emitting element, includes a first driving module. A control end of the first driving module is electrically connected to a first node, a first end of the first driving module is electrically connected to a voltage signal line of a first power supply, and a second end of the first driving module is electrically connected to a first electrode of a light-emitting element. A control end of the data writing module is electrically connected to a first scanning signal line, a first end of the data writing module is electrically connected to a data signal line, and a second end of the data writing module is electrically connected to the first node.

17 Claims, 20 Drawing Sheets

PIXEL CIRCUIT, CURRENT SOURCE CIRCUIT AND DISPLAY MODULE

CROSS-REFERENCE TO RELATED APPLICATION

This application claims priority of Chinese Patent Application No. 202311507685.4, filed on Nov. 13, 2023, the entire contents of which are hereby incorporated by reference.

FIELD OF THE DISCLOSURE

The present disclosure generally relates to the field of display technology and, more particularly, relates to a pixel circuit, a current source circuit and a display module.

BACKGROUND

With rapid development of science and technology, display modules are increasingly used in modern life. However, display effects of current display modules need more improvement.

BRIEF SUMMARY OF THE DISCLOSURE

One aspect of the present disclosure provides a pixel circuit. The pixel circuit includes a first driving branch and a data writing module. The first driving branch, connected to a light-emitting element, includes a first driving module. A control end of the first driving module is electrically connected to a first node, a first end of the first driving module is electrically connected to a voltage signal line of a first power supply, and a second end of the first driving module is electrically connected to a first electrode of a light-emitting element. A control end of the data writing module is electrically connected to a first scanning signal line, a first end of the data writing module is electrically connected to a data signal line, and a second end of the data writing module is electrically connected to the first node. The data signal transmitted by the data signal line is a data signal with a controllable current value.

Another aspect of the present disclosure provides a current source circuit. The current source circuit includes a current control module and a signal input module. A control end of the current control module is electrically connected to a first control node, a first end of the current control module is electrically connected to a voltage signal line of a third power supply. The signal input module is electrically connected to a current control signal end and the current control module respectively and configured to write a current control signal at the current control signal end into the first control node, so that the first control node achieves a target potential. The current control module is turned on under control of the first control node at the target potential, and outputs an electrical signal driven by a voltage signal of the third power supply provided by a voltage signal end of the third power supply. The data signal includes an electrical signal output by the current control module.

Another aspect of the present disclosure provides a display module. The display module includes pixel circuits and current source circuits. A pixel circuit of the pixel circuits includes a first driving branch and a data writing module. The first driving branch, connected to a light-emitting element, includes a first driving module. A control end of the first driving module is electrically connected to a first node, a first end of the first driving module is electrically connected to a voltage signal line of a first power supply, and a second end of the first driving module is electrically connected to a first electrode of a light-emitting element. A control end of the data writing module is electrically connected to a first scanning signal line, a first end of the data writing module is electrically connected to a data signal line, and a second end of the data writing module is electrically connected to the first node. The data signal transmitted by the data signal line is a data signal with a controllable current value. A current source circuit of the current source circuits includes a current control module and a signal input module. A control end of the current control module is electrically connected to a first control node, a first end of the current control module is electrically connected to a voltage signal line of a third power supply. The signal input module is electrically connected to a current control signal end and the current control module respectively and configured to write a current control signal at the current control signal end into the first control node, so that the first control node achieves a target potential. The current control module is turned on under control of the first control node at the target potential, and outputs an electrical signal driven by a voltage signal of the third power supply provided by a voltage signal end of the third power supply. The data signal includes an electrical signal output by the current control module. The current source circuit supplies a data signal to the pixel circuit through a data signal line.

Other aspects of the present disclosure can be understood by a person skilled in the art in light of the description, the claims, and the drawings of the present disclosure.

BRIEF DESCRIPTION OF THE DRAWINGS

To describe technical solutions in embodiments of the present disclosure more clearly, accompanying drawings required to be used in the embodiments of the present disclosure will be briefly introduced below. A person skilled in the art may further derive other drawings from the accompanying drawings without creative efforts.

DETAILED DESCRIPTION

Figure 1:
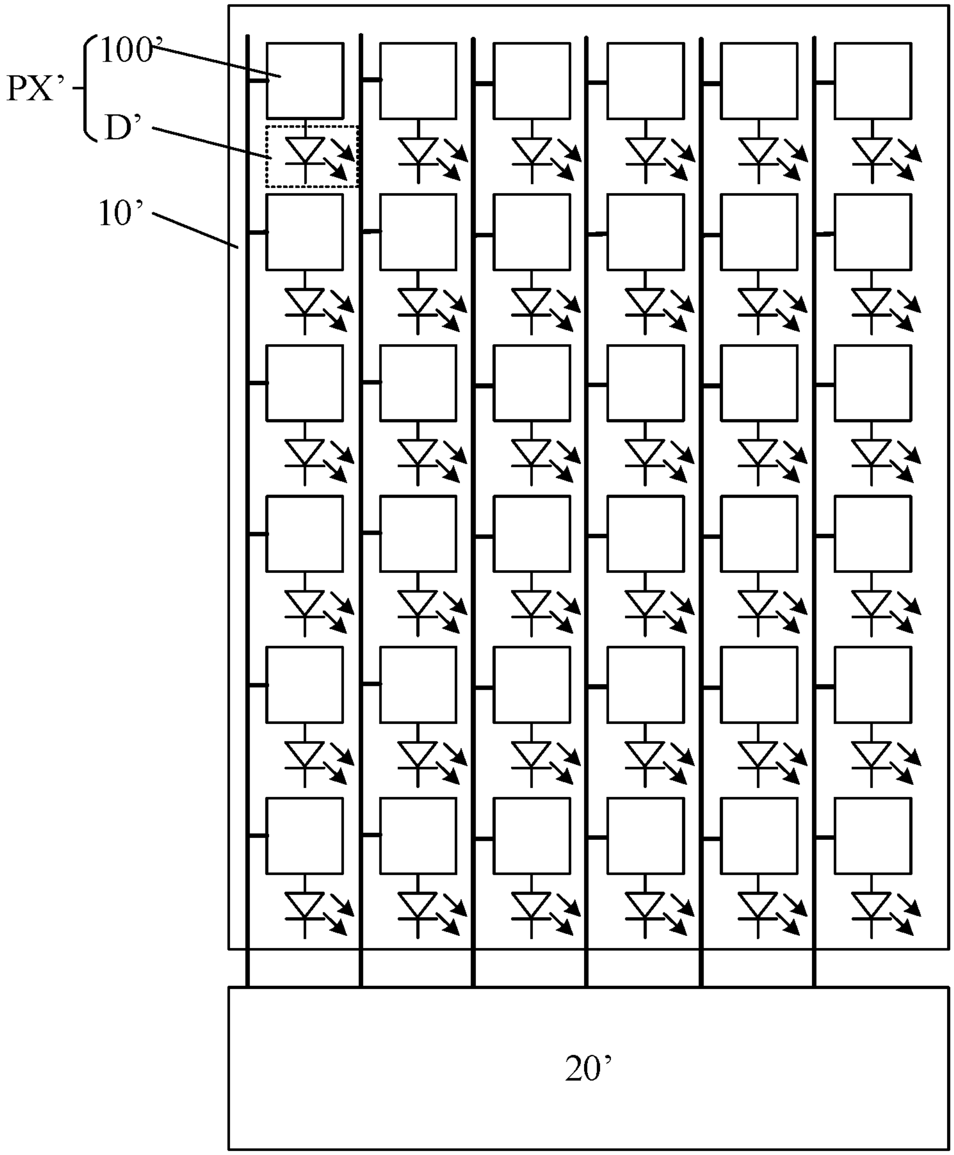
FIG. 1 illustrates a circuit connection diagram of a display module.

Features and exemplary embodiments of various aspects of the present disclosure will be described in detail below. To make objectives, technical solutions, and advantages of the present disclosure clearer, the present disclosure will be further described in detail below with reference to accompanying drawings and specific embodiments. The specific embodiments described herein are only for explaining and are not intended to limit the present disclosure. It will be apparent to a person skilled in the art that the present disclosure may be practiced without certain specific details. The following description of the embodiments is merely intended to enhance understanding of the present disclosure by illustrating the embodiments thereof.

It should be noted that in the present specification, relational terms such as first and second may be used solely to distinguish one entity or action from another without necessarily requiring or implying any actual such relationship or order between such entities or actions. Terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Without further limitation, an element defined by the statement "includes . . . " does not exclude a presence of another identical element in a process, method, article, or device that includes the element.

The term "and/or" used in the present specification is only an association relationship describing related objects, which means that there can be three relationships. For example, A and/or B can mean that A alone exists, both A and B exist, and B alone exists. In addition, the character "/" in the present specification generally indicates that the associated objects before and after are in an "or" relationship.

It should be noted that transistors in the embodiments of the present disclosure may be N-type transistors or P-type transistors. For an N-type transistor, a turned-on level is a high level, and a turned-off level is a low level. That is, when a gate of the N-type transistor is at the high level, a first electrode and a second electrode thereof are connected, and when the gate of the N-type transistor is at the low level, the first electrode and the second electrode thereof are disconnected. For a P-type transistor, the turned-on level is the low level, and the turned-off level is the high level. That is, when a control end of the P-type transistor is at the low level, a connection between the first and second electrodes of the P-type transistor is turned on. When the control end of the P-type transistor is at the high level, the connection between the first and second electrodes of the P-type transistor is turned off. In a specific implementation, a gate of each transistor serves as a control electrode, and according to a signal of the gate of each transistor and type thereof, the first electrode can be used as a source, and the second electrode can be used as a drain, or the first electrode can be used as a drain, and the second electrode can be used as a source, which is not limited herein. In addition, the turned-on level, and the turned-off level in the embodiments of the present disclosure are general terms. The turned-on level refers to any level that can turn on the transistor, and the turned-off level refers to any level that can turn off the transistor.

In the embodiments of the present disclosure, a term "electrical connection" may refer to a direct electrical connection between two components or may refer to an electrical connection between two components via one or more other components.

In the embodiments of the present disclosure, a first node, a first control node or the like is only defined for a convenience of describing a circuit structure. The first node, the first control node or the like is not an actual circuit unit.

It is apparent to a person skilled in the art that various modifications and changes can be made in the present disclosure without departing from the spirit or scope of the present disclosure. Therefore, the present disclosure is intended to cover modifications and variations of the present disclosure provided such modifications and variations fall within the scope of the corresponding claims (claimed technical solutions) and equivalents thereof. It should be noted that implementation modes provided in the embodiments of the present disclosure can be combined, provided there is no contradiction.

Before elaborating on the technical solutions provided by the embodiments of the present disclosure, to facilitate understanding of the embodiments of the present disclosure, the present disclosure first provides a specific explanation of issues present in related technologies.

FIG. 1 illustrates a circuit connection diagram of a display module. As shown in FIG. 1, the display module may include a display panel 10' and a data signal supply module 20'. Exemplarily, the data signal supply module 20' includes but is not limited to a display driver integrated circuit (DDIC). The display panel 10' may include a plurality of sub-pixels PX' and a plurality of data signal lines "data". A subpixel PX' may include a pixel circuit 100' and a light emitting element D'. A data signal line "data"' may provide a data signal to the pixel circuit 100'. A brightness of the light-emitting element D' driven by the pixel circuit 100' is affected by a potential of the data signal. That is, by adjusting the potential of the data signal, the brightness of the light-emitting element D', driven by the pixel circuit 100', can be adjusted. In a related art, the potential of the data signal transmitted by the data signal supply module 20' to the data signal line "data"' is controllable, but a current value of the data signal is not controllable. Therefore, a voltage drop of the data signal on the data signal line "data" is difficult to control, so that the potential of the data signal received by the pixel circuit 100' may deviate from an expected potential and the brightness of the light-emitting element D' driven by the pixel circuit 100' may deviate from an expected brightness, leading to uneven display brightness in the display module.

The embodiments of the present disclosure provide a pixel circuit, a current source circuit and a display module, which can solve the above technical problems present in related technologies.

A technical concept of the embodiments of the present disclosure is to transmit a data signal with a controllable current value to a data writing module in the pixel circuit through a data signal line. The data signal line transmits a data signal with a controllable current value to the data writing module in the pixel circuit, which is conducive to avoiding the data signal being affected by a voltage drop on the data signal line. As a result, the data signal received by the pixel circuit maintains a potential that is either same as or close to the expected potential, thereby ensuring a brightness of the light-emitting element, driven by the pixel circuit, to reach an expected brightness, improving uneven display brightness of the display module, and enhancing a display effect of the display module. In addition, the data signal in the embodiments of the present disclosure is a data signal with a controllable current value, that is, a current data signal, which exhibits strong anti-interference ability and is conducive to improving display stability.

The following first introduces the pixel circuit provided by the embodiments of the present disclosure.

Figure 2:
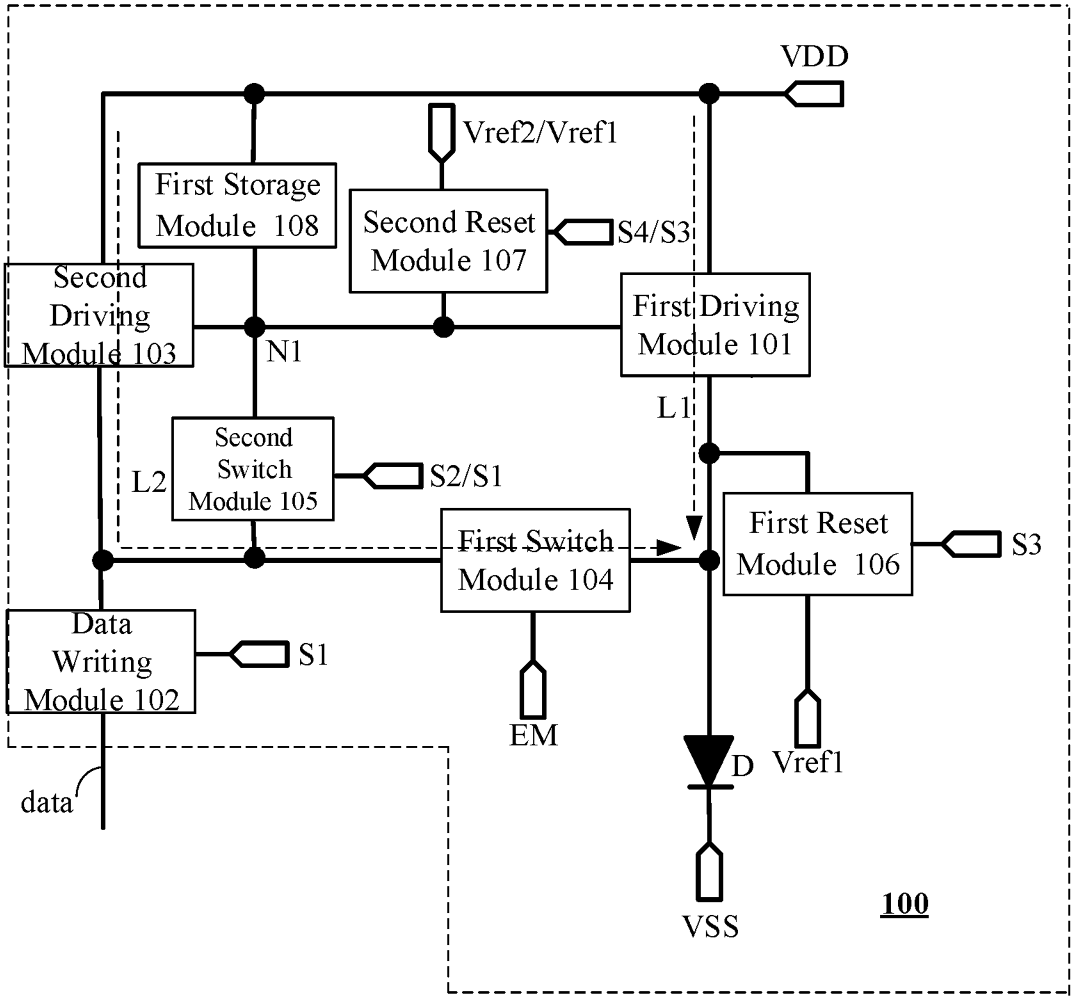
FIG. 2 illustrates a circuit connection diagram of a pixel circuit consistent with various embodiments of the present disclosure.

FIG. 2 illustrates a circuit connection diagram of a pixel circuit consistent with various embodiments of the present disclosure. As shown in FIG. 2, the pixel circuit 100 may include a first driving branch L1 connected to a light-emitting element D. The first driving branch L1 may be configured to drive the light-emitting element D to emit light. The first driving branch L1 may include a first driving module 101, a control end of the first driving module 101 is electrically connected to a first node N1, a first end of the first driving module 101 is electrically connected to a voltage signal line VDD of a first power supply and a second end of the first driving module 101 is electrically connected to a first electrode of the light emitting element D. The light emitting element D may include the first electrode and a second electrode. The second electrode of the light emitting element D may be electrically connected to a voltage signal line VSS of a second power supply. For example, a first electrode of the light-emitting element D may be an anode of the light-emitting element D, and a second electrode of the light-emitting element D may be a cathode of the light-emitting element D. Exemplarily, the voltage signal line VDD of the first power supply may be configured to transmit a voltage signal of a power supply with a positive potential, e.g., a voltage signal of a power supply with a potential greater than 0 V.

The pixel circuit 100 may also include a data writing module 102. A control end of the data writing module 102 is electrically connected to a first scanning signal line S1. A first end of the data writing module 102 is electrically connected to a data signal line "data". A second end of the module 102 is electrically connected to the first node N1, and the data writing module 102 is configured to transmit a data signal of the data signal line "data" to the first node N1. The first driving module 101 may be turned on in response to a turned-on level of the first node N1, and the first driving module 101 provides a driving current to the light-emitting element D to drive the light-emitting element D to emit light.

In one embodiment, the data signal transmitted by the data signal line "data" may be a data signal with a controllable current value. That is, a current value of the data signal transmitted by the data signal line "data" can be adjusted to reach an expected current. The expected current can be any predefined current value and can be flexibly adjusted according to an actual situation, which is not limited herein.

Taking the expected current as Im, since a position of the pixel circuit is fixed, a length of the data signal line "data" between the pixel circuit and a data signal supply end (including but not limited to a signal output end of the current source circuit described below) can be determined, and an impedance R of the data signal line "data" between the pixel circuit and the data signal supply end can also be determined. Therefore, the voltage drop Vm of the data signal received by the pixel circuit on the data signal line "data" can also be determined, for example, Vm=Im*R. For example, the potential of the data signal output by the data signal supply end is V1, and the potential of the data signal received by the pixel circuit is V2, and V1=Vm+V2. Therefore, when the voltage drop Vm is controllable, the potential V2 of the data signal received by the pixel circuit can be adjusted to match or closely approximate the expected potential. Achieving the expected potential ensures that the brightness of the light-emitting element driven by the pixel circuit reaches the expected brightness, thereby improving uneven display brightness of the display module, and improving the display effect of the display module.

In addition, there may be some electromagnetic interferences in the pixel circuit, and an electromagnetic interference can be equivalent to a signal source with a high internal resistance. An electromagnetic interference signal is characterized by a large amplitude (e.g., a large voltage) but a low power (e.g., a small current). Therefore, the electromagnetic interference signal has a greater impact on voltage signals (e.g., electrical signals controlled by potentials) but has less impact on current signals (e.g., electrical signals controlled by current values). The data signal in the embodiments of the present disclosure is a data signal with a controllable current value, that is, a current data signal. Therefore, the data signal in the embodiments of the present disclosure has strong anti-interference ability, which is conducive to improving display stability.

As shown in FIG. 2, in some embodiments, optionally, the pixel circuit 100 may also include a second driving branch L2. The second driving branch L2 may be connected to the light-emitting element D. The second driving branch L2 can be configured to drive the light-emitting element D to emit light. In some embodiments, the first driving branch L1 and the second driving branch L2 can jointly drive the light-emitting element D to emit light, thereby increasing a driving current output by the pixel circuit 100 so that the brightness of the light-emitting element D can reach a higher brightness and improving a brightness adjustment range of the light-emitting element D.

Specifically, the second driving branch L2 may include a second driving module 103, a control end of the second driving module 103 is electrically connected to the first node N1, a first end of the second driving module 103 is electrically connected to the voltage signal line VDD of the first power supply, and a second end of the second driving module 103 is electrically connected to the first electrode of the light-emitting element D. For example, during a light-emitting phase, the first driving module 101 can be turned on in response to the turned-on level of the first node N1, and the second driving module 103 can also be turned on in response to the turned-on level of the first node N1. The first driving module 101 can provide a driving current I1 to the light-emitting element D, and the second driving module 103 can provide a driving current I2 to the light-emitting element D. The light-emitting element D receives a driving current I=I1+I2 and emits light.

Therefore, the first driving module 101 and the second driving module 103 can jointly drive the light-emitting element D to emit light, thereby increasing the driving current output by the pixel circuit 100 so that the brightness of the light-emitting element D can reach a higher brightness, thereby increasing the brightness adjustment range of the light-emitting element D.

Figure 3:
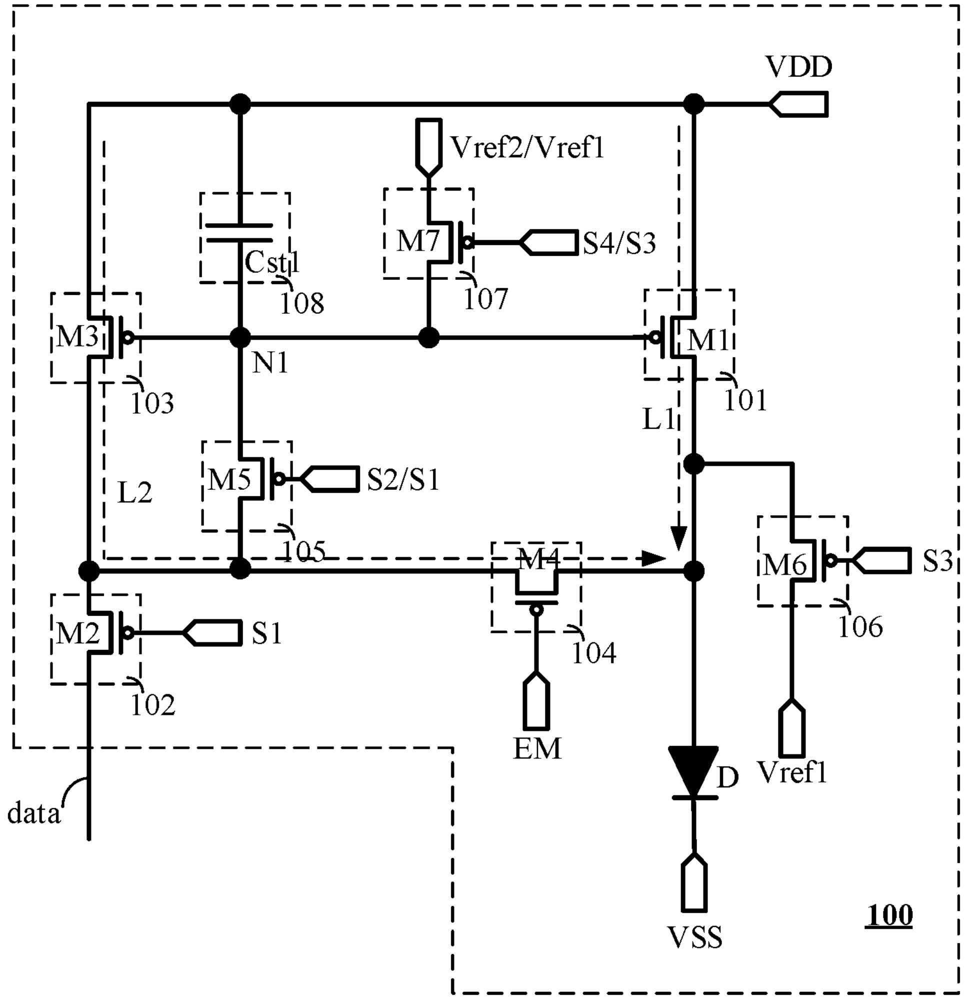
FIG. 3 illustrates another circuit connection diagram of a pixel circuit consistent with various embodiments of the present disclosure.

FIG. 3 illustrates another circuit connection diagram of a pixel circuit consistent with various embodiments of the present disclosure. As shown in FIG. 3, in some embodiments, optionally, both the first driving module 101 and the second driving module 103 can include a same type of transistors, so that the turned-on level of the first node N1 can control the first driving module 101 to be turned on/off simultaneously. For example, both the first driving module 101 and the second driving module 103 may include P-type transistors.

Correspondingly, for example, during the light-emitting phase, both the first driving module 101 and the second driving module 103 can be turned on in response to a low level of the first node N1, and the first driving module 101 and the second driving module 103 can jointly drive the light-emitting element D to emit light.

In some embodiments, optionally, both the first driving module 101 and the second driving module 103 may include N-type transistors.

Correspondingly, for example, in the light-emitting phase, both the first driving module 101 and the second driving module 103 can be turned on in response to a high level of the first node N1, and the first driving module 101 and the second driving module 103 can jointly drive the light-emitting element D to emit light.

As shown in FIG. 2 or FIG. 3, in some embodiments, optionally, the second driving branch L2 may also include a first switch module 104. A control end of the first switch module 104 is electrically connected to a light-emitting control signal line EM. A first end of the first switch module 104 is connected to a second end of the second driving module 103. A second end of the first switch module 104 is electrically connected to the first electrode of the light-emitting element D. The first switch module 104 can be turned on or off under a control of the light-emitting control signal line EM. In some embodiments, by controlling the first switch module 104 to be turned on or off, whether the second driving branch L2 provides a driving current to the light-emitting element D can be controlled. For example, when the light-emitting element D emits light (e.g., during the light-emitting phase), the first switch module 104 can be turned on under a control of the light-emitting control signal line EM, and the first driving branch L1 and the second driving branch L2 can jointly drive the light emitting element D to emit light, thereby increasing the driving current output by the pixel circuit 100.

For another example, in other embodiments, when the light-emitting element D emits light (e.g., during the light-emitting phase), the first switch module 104 can be turned off under a control of the light-emitting control signal line EM, and then the first switch module 104 can prevent the driving current of the second driving module 103 from flowing to the first electrode of the light-emitting element D, and only the first driving branch can L1 drives the light-emitting element D to emit light.

Therefore, by adding the first switch module 104, whether the second driving branch L2 provides driving current to the light-emitting element D can be controlled, thereby increasing the brightness adjustment range of the light-emitting element and meeting requirements of various brightness situations.

Figure 4:
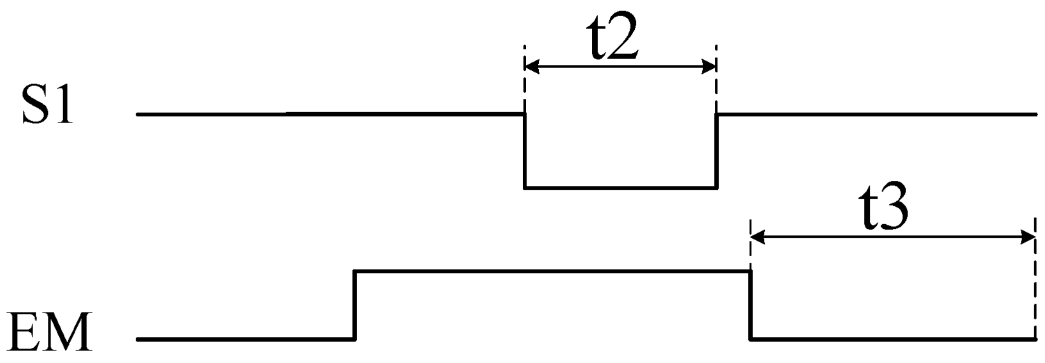
FIG. 4 illustrates a driving timing diagram of a pixel circuit consistent with various embodiments of the present disclosure.

FIG. 4 illustrates a driving timing diagram of a pixel circuit consistent with various embodiments of the present disclosure. Taking a driving timing diagram shown in FIG. 4, as an example, both the data writing module 102 and the first switch module 104 shown in FIG. 3 are P-type transistors. Referring to FIG. 3 and FIG. 4, in some embodiments, optionally, a phase when the data writing module 102 is turned on is called the data writing phase t2. During the data writing phase t2, the data writing module 102 can respond to a turned-on level (such as a low level) of the first scanning signal line S1, the data writing module 102 can transmit the data signal from the data signal line "data" to the first node N1, thereby realizing a writing of the data signal.

The first switch module 104 may be used to turn off during the phase when the data writing module 102 is turned on (e.g., in the data writing phase t2). For example, in the data writing phase t2, the first switch module 104 may be turned off in response to a turned-off level (e.g., a high level) of the light-emitting control signal line EM.

Therefore, the first switch module 104 is turned off during the data writing phase t2, which can effectively prevent the data signal of the data signal line "data" from being shunted to the first electrode of the light-emitting element D through the first switch module 104, so that the data signal of the data signal line "data" is written to the first node N1, thereby ensuring that the first node N1 can reach the expected potential.

Referring to FIG. 3 and FIG. 4, in some embodiments, optionally, the phase in which the light-emitting element D emits light is called a light-emitting phase t3. During the light-emitting phase t3, the data writing module 102 can be turned off in response to a turned-off level (e.g. a high level) of the first scanning signal line S1, the first driving module 101 can be turned on in response to the turned-on level of the first node N1, and the second driving module 103 can also be turned on in response to the turned-on level of the first node N1, and the first switch module 104 can be turned on in response to the turned-on level (e.g., the low level) of the light-emitting control signal line EM. The first driving module 101 can provide the driving current I1 to the light-emitting element D. The driving current I2 of the second driving module 103 can be transmitted to the light-emitting element D through the first switch module 104. The light-emitting element D receives a driving current I=I1+I2 and emits light.

Referring to FIG. 2 and FIG. 3, in some embodiments, optionally, the pixel circuit 100 may further include a second switch module 105. A control end of the second switch module 105 may be electrically connected to a second scanning signal line S2. A first end of the second switch module 105 may be connected to a second end of the data writing module 102. A second end of the second switch module 105 may be electrically connected to the first node N1. The second switch module 105 may be configured to be turned on when the data writing module 102 is turned on (e.g., in the data writing phase). During the data writing phase, the data writing module 102 may be turned on in response to a turned-on level of the first scanning signal line S1, and the second switch module 105 may be turned on in response to a turned-on level of the second scanning signal line S2, The data signal of the data signal line "data" is sequentially written to the first node N1 through the data writing module 102 and the second switch module 105, thereby realizing the writing of the data signal.

Referring to FIG. 2 and FIG. 3, in some embodiments, optionally, the second scanning signal line S2 and the first scanning signal line S1 may be a same scanning signal line. For example, the second scanning signal line S2 may be multiplexed as the first scanning signal line S1, or the first scanning signal line S1 and the second scanning signal line S2 transmit a same scanning signal. That is, during the data writing phase, both the data writing module 102 and the second switch module 105 can be turned on in response to the turned-on level of the first scanning signal line S1, and the data signal of the data signal line "data" is sequentially written to the first node N1 through the data writing module 102 and the second switch module 105, thereby realizing the writing of the data signal. Therefore, since the second scanning signal line S2 and the first scanning signal line S1 are a same scanning signal line, number of scanning signal lines in the display module and number of gate drive circuits used to provide scanning signals in the display module can be reduced, which is conducive to simplifying a wiring design and reducing a production cost of the display module. In some other embodiments, the second scanning signal line S2 and the first scanning signal line S1 may also be different scanning signal lines, which is not limited herein.

Referring to FIG. 2 and FIG. 3, in some embodiments, optionally, the pixel circuit 100 may further include a first reset module 106. A control end of the first reset module 106 may be electrically connected to a third scanning signal line S3. A first end of the first reset module 106 may be electrically connected to a first reset signal line Vref1. A second end of the first reset module 106 may be electrically connected to the first electrode of the light-emitting element D. The first reset module 106 may configured to reset the first electrode of the light-emitting element D. The first reset signal from the first reset signal line Vref1 is transmitted to the first electrode of the light-emitting element D to reset the first electrode of the light-emitting element D. Exemplarily, a potential of the first reset signal may be less than OV, e.g., a negative potential. Therefore, by adding the first reset module 106 to reset the first electrode of the light-emitting element D, a residual charge at the first electrode of the light-emitting element D can be released, effectively improving an image sticking phenomenon.

Referring to FIG. 2 and FIG. 3, in some embodiments, optionally, the pixel circuit 100 may further include a second reset module 107. A control end of the second reset module 107 may be electrically connected to a fourth scanning signal line S4. A first end of the second reset module 107 may be electrically connected to a second reset signal line Vref2. A second end of the second reset module 107 may be electrically connected to the first node N1. The second reset module 107 may be configured to reset the first node N1. The second reset module 107 may be turned on in response to a turned-on level of the fourth scanning signal line S4 and transmit a second reset signal of the second reset signal line Vref2 to the first node N1 to reset the first node N1. For example, the potential of the second reset signal may be less than OV, e.g., a negative potential. Therefore, Adding the second reset module 107 to reset the first node N1 can ensure that a subsequent data signal can be successfully written to the first node N1, thereby ensuring a normal lighting of the light-emitting element and a normal display of the display module.

Referring to FIG. 2 and FIG. 3, in some embodiments, optionally, during the phase when the first reset module 106 is turned on, the first switch module 104 may be turned off in response to the turned-off level of the light-emitting control signal line EM. That is, when the first electrode of the light-emitting element D is reset, the first switch module 104 can be turned off. The first switch module 104 is turned off when the first electrode of the light-emitting element D is reset, which can effectively prevent the first reset signal written to the first electrode of the light-emitting element D from being shunted to the pixel circuit through the first switch module 104 and ensure that a potential of the first electrode of the light-emitting element D can be reset to the expected potential, thereby improving a resetting effect of the first electrode of the light-emitting element D.

Referring to FIG. 2 and FIG. 3, in some embodiments, optionally, the third scanning signal line S3 and the fourth scanning signal line S4 may be a same scanning signal line. For example, the fourth scanning signal line S4 may be multiplexed as the third scanning signal line S3, or the third scanning signal line S3 and the fourth scanning signal line S4 transmit a same scanning signal. That is, both the first reset module 106 and the second reset module 107 may be turned on in response to a turned-on level of the third scanning signal line S3. The first reset module 106 may transmit the first reset signal of the first reset signal line Vref1 to the first electrode of the light-emitting element D to reset the first electrode of the light-emitting element D. The second reset module 107 may transmit the second reset signal of the second reset signal line Vref2 to the first node N1 to reset the first node N1. Therefore, since the third scanning signal line S3 and the fourth scanning signal line S4 are a same scanning signal line, number of scanning signal lines in the display module and number of gate drive circuits used to provide scanning signals in the display module can be reduced, which is conducive to simplifying the wiring design and reducing the production cost of the display module. In some other embodiments, the third scanning signal line S3 and the fourth scanning signal line S4 may also be different scanning signal lines, which is not limited herein.

As shown in FIG. 3, in some embodiments, the second reset signal line Vref2 and the first reset signal line Vref1 may be different signal lines. For example, a potential of the second reset signal transmitted by the second reset signal line Vref2 may be different from a potential of the first reset signal transmitted by the first reset signal line Vref1.

In some other embodiments, optionally, the second reset signal line Vref2 may also be multiplexed as the first reset signal line Vref1. That is, the first reset module 106 may transmit the first reset signal of the first reset signal line Vref1 to the first electrode of the light-emitting element D to reset the first electrode of the light-emitting element D. The second reset module 107 may transmit the first reset signal of the first reset signal line Vref1 to the first node N1 to reset the first node N1. Therefore, since the second reset signal line Vref2 is multiplexed as the first reset signal line Vref1, number of reset signal lines in the display module can be reduced, which is conducive to simplifying the wiring design and reducing the production cost of the display module.

In some embodiments, optionally, the second reset signal line Vref2 may not be multiplexed as the first reset signal line Vref1. That is, the first reset signal line Vref1 and the second reset signal line Vref2 may be different reset signal lines. For example, the potential of the first reset signal transmitted by the first reset signal line Vref1 may be different from the potential of the second reset signal transmitted by the second reset signal line Vref2. Therefore, both the first node N1 and the first electrode of the light-emitting element D can be reset to respective expected potentials thereof.

Figure 5:
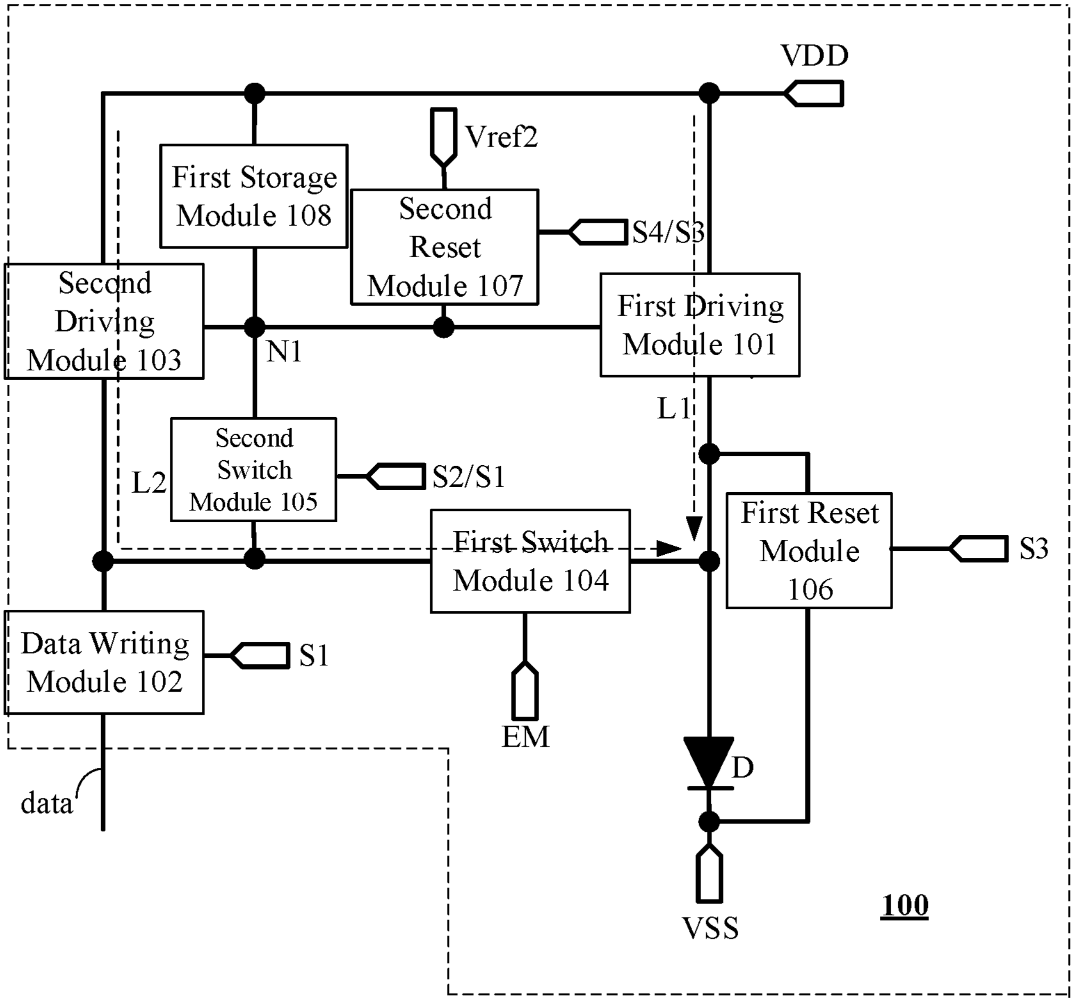
FIG. 5 illustrates another circuit connection diagram of a pixel circuit consistent with various embodiments of the present disclosure.

FIG. 5 illustrates another circuit connection diagram of a pixel circuit consistent with various embodiments of the present disclosure. As shown in FIG. 5, different from the embodiment shown in FIG. 2, in one embodiment, optionally, the first reset signal line Vref1 can be multiplexed as the voltage signal line VSS of the second power supply.

Specifically, the control end of the first reset module 106 may be electrically connected to the third scanning signal line S3, the first end of the first reset module 106 may be electrically connected to the first reset signal line Vref1, and the second end of the first reset module 106 may be electrically connected to the first electrode of the light-emitting element D. The first reset module 106 may be used to reset the first electrode of the light-emitting element D. The control end of the second reset module 107 can be electrically connected to the fourth scanning signal line S4, the first end of the second reset module 107 may be electrically connected to the second reset signal line Vref2. The second end of the second reset module 107 may be electrically connected to the first node N1. The second reset module 107 may be configured to reset the first node N1.

The second electrode of the light-emitting element D may be electrically connected to the voltage signal line VSS of the second power supply, and the voltage signal line VSS of the second power supply may be multiplexed as the first reset signal line Vref1. Exemplarily, the second electrode of the light-emitting element D may be the cathode of the light-emitting element D. A potential of a voltage signal of the second power supply transmitted by the voltage signal line VSS of the second power supply may be less than OV. That is, the voltage signal line VSS of the second power supply can not only provide the voltage signal of the second power supply with a negative potential to the second electrode of the light-emitting element D, but the voltage signal of the second power supply can also be configured to reset the first electrode of the light-emitting element D. By multiplexing the voltage signal line VSS of the second power supply as the first reset signal line Vref1, number of reset signal lines in the display module can be reduced, which is conducive to simplifying the wiring design and reducing the production cost of the display module.

In the embodiment shown in FIG. 5, the third scanning signal line S3 and the fourth scanning signal line S4 may also be a same scanning signal line. For example, the fourth scanning signal line S4 can be multiplexed as the third scanning signal line S3, or the third scanning signal line S3 can be multiplexed as the fourth scanning signal line S4. Therefore, number of scanning signal lines in the display module and number of gate drive circuits used to provide scanning signals in the display module can be reduced, which is conducive to simplifying the wiring design and reducing the production cost of the display module.

In the embodiment shown in FIG. 5, the third scanning signal line S3 and the fourth scanning signal line S4 may also be different scanning signal lines, that is, the third scanning signal line S3 is not multiplexed as the fourth scanning signal line S4, which is not limited herein.

Referring to FIG. 2 and FIG. 5, in some embodiments, optionally, the pixel circuit 100 may further include a first storage module 108, a first end of the first storage module 108 may be electrically connected to the voltage signal line VDD of the first power supply, and a second end of the first storage module 108 may be electrically connected to the first node N1. The first storage module 108 may be configured to maintain a potential of the first node N1. For example, during the light-emitting phase, the first storage module 108 can maintain the first node N1 at a turned-on level, thereby ensuring that the first driving module 101 and the second driving module 103 can maintain a turned-on state, and the first driving module 101 and the second driving module 103 can continuously provide a driving current to the first electrode of the light-emitting element D, thereby enabling the light-emitting element D to maintain light emission and prolong a light-emitting time of the light-emitting element.

Figure 6:
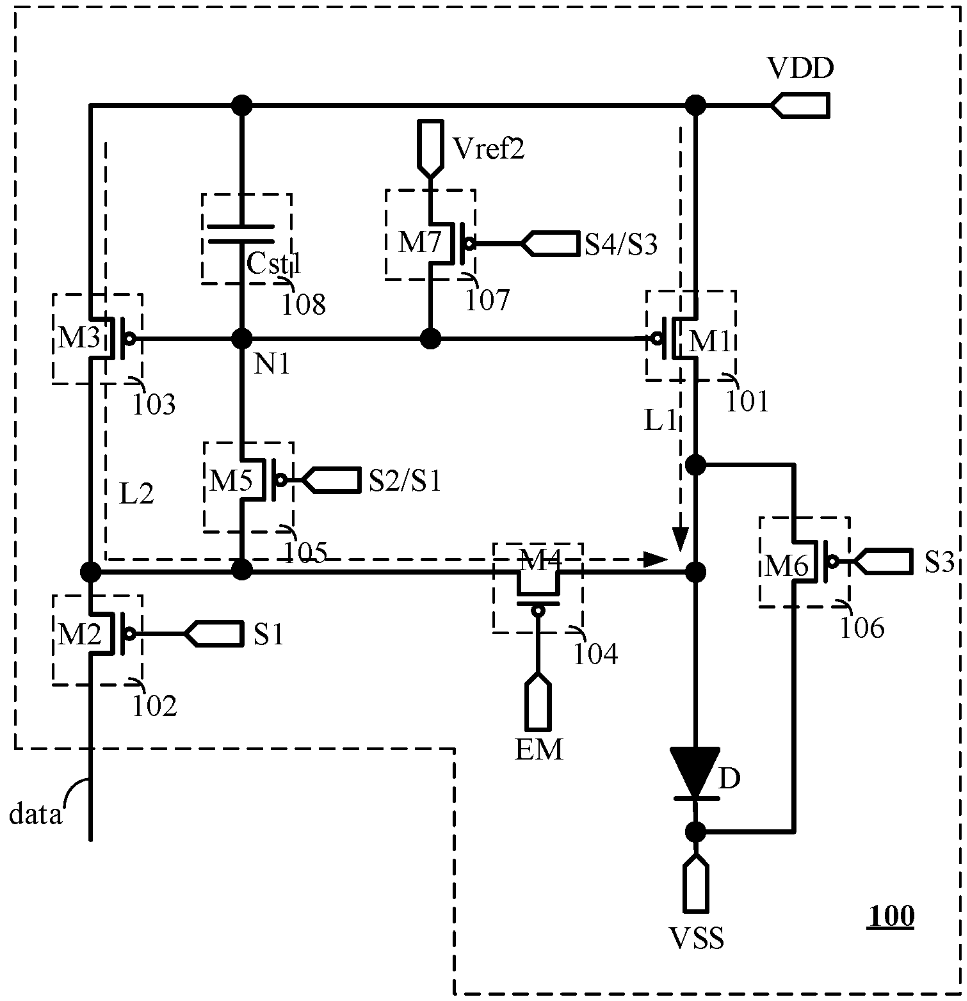
FIG. 6 illustrates another circuit connection diagram of a pixel circuit consistent with various embodiments of the present disclosure.

FIG. 6 illustrates another circuit connection diagram of a pixel circuit consistent with various embodiments of the present disclosure. Referring to FIG. 3 and FIG. 6, in some embodiments, optionally, the pixel circuit 100 may include the first driving module 101, the data writing module 102, the second driving module 103, the first switch module 104, the second switch module 105, the first reset module 106, the second reset module 107 and the first storage module 108. FIG. 3 shows an example in which the first end of the first reset module 106 is connected to the first reset signal line Vref1. FIG. 6 shows an example in which the first end of the first reset module 106 is connected to the voltage signal line VSS of the second power supply, that is, the voltage signal line VSS of the second power supply is multiplexed as the first reset signal line Vref1. In other embodiments, the voltage signal line VSS of the second power supply may not be multiplexed as the first reset signal line Vref1, and the first end of the first reset module 106 is connected to the first reset signal line Vref1, which is not limited herein.

The first driving module 101 may include a first transistor M1, the data writing module 102 may include a second transistor M2, the second driving module 103 may include a third transistor M3, the first switch module 104 may include a fourth transistor M4, the second switch module 105 may include a fifth transistor M5, the first reset module 106 may include a sixth transistor M6, the second reset module 107 may include a seventh transistor M7, and the first storage module 108 may include a first storage capacitor Cst1.

A gate of the first transistor M1 is electrically connected to the first node N1, a first electrode of the first transistor M1 is electrically connected to the voltage signal line VDD of the first power supply, and a second electrode of the first transistor M1 is electrically connected to the first electrode of the light-emitting element D. A gate of the second transistor M2 is electrically connected to the first scanning signal line S1, a first electrode of the second transistor M2 is electrically connected to the data signal line "data", and a second electrode of the second transistor M2 is electrically connected to the second node N2. A gate of the third transistor M3 is electrically connected to the first node N1, a first electrode of the third transistor M3 is electrically connected to the signal line VDD of the first power supply, and a second electrode of the third transistor M3 is electrically connected to the second node N2. A gate of the fourth transistor M4 is electrically connected to the light-emitting control signal line EM, a first electrode of the fourth transistor M4 is electrically connected to the second node N2, and a second electrode of the fourth transistor M4 is electrically connected to the first electrode of the light-emitting element D. A gate of the fifth transistor M5 may be electrically connected to the second scanning signal line S2, a first electrode of the fifth transistor M5 may be electrically connected to the second node N2, and a second electrode of the fifth transistor M5 may be electrically connected to the first node N1. A gate of the sixth transistor M6 may be electrically connected to the third scanning signal line S3, a first electrode of the sixth transistor M6 may be electrically connected to the first reset signal line Vref1 or the voltage signal line VSS of the second power supply and a second electrode of the sixth transistor M6 may be electrically connected to the first electrode of the light emitting element D. A gate of the seventh transistor M7 may be electrically connected to the fourth scanning signal line S4, a first electrode of the seventh transistor M7 may be electrically connected to the second reset signal line Vref2, and a second electrode of the seventh transistor M7 may be electrically connected to the first node N1. A first plate of the first storage capacitor Cst1 may be electrically connected to the voltage signal line VDD of the first power supply, and a second plate of the first storage capacitor Cst1 may be electrically connected to the first node N1.

In some embodiments, the second scanning signal line S2 may be multiplexed as the first scanning signal line S1. In some embodiments, the fourth scanning signal line S4 may be multiplexed as the third scanning signal line S3. In some embodiments, the second reset signal line Vref2 may be multiplexed as the first reset signal line Vref1.

Figure 7:
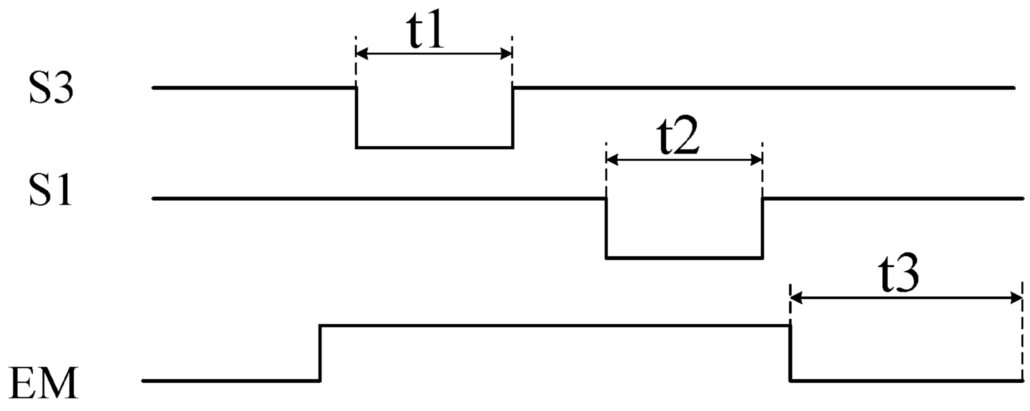
FIG. 7 illustrates another driving timing diagram of a pixel circuit consistent with various embodiments of the present disclosure.

FIG. 7 illustrates another driving timing diagram of a pixel circuit consistent with various embodiments of the present disclosure. Referring to FIG. 3, FIG. 6 and FIG. 7, in some embodiments, optionally, a working process of the pixel circuit 100 may include a reset phase t1, a data writing phase t2 and a light emitting phase t3.

During the reset phase t1, the sixth transistor M6 and the seventh transistor M7 are turned on in response to the turned-on level of the third scanning signal line S3, the second transistor M2 and the fifth transistor M5 are turned off in response to a turned-off level of the first scanning signal line S1, and the fourth transistor M4 is turned off in response to the turned-off level of the light-emitting control signal line EM. The sixth transistor M6 may transmit the first reset signal of the first reset signal line Vref1 or the voltage signal of the voltage signal line VSS of the second power supply to reset the first electrode of the light-emitting element D. The seventh transistor M7 may transmit the second reset signal of the second reset signal line Vref2 to the first node N1 to reset the first node N1.

During the data writing phase t2, the second transistor M2 and the fifth transistor M5 are turned on in response to the turned-on level of the first scanning signal line S1, and the fourth transistor M4 is turned off in response to the turned-off level of the light-emitting control signal line EM, The sixth transistor M6 and the seventh transistor M7 are turned off in response to the turned-off level of the third scanning signal line S3. The data signal of the data signal line “data” is sequentially written into the first node N1 through the second transistor M2 and the fifth transistor M5. The first storage capacitor Cst1 maintains the potential of the first node N1.

During the light-emitting phase t3, the first transistor M1 and the third transistor M3 are turned on in response to the turned-on level of the first node N1, the second transistor M2 and the fifth transistor M5 are turned off in response to the turned-off level of the first scanning signal line S1, the fourth transistor M4 is turned on in response to a turned-on level of the light-emitting control signal line EM, and the sixth transistor M6 and the seventh transistor M7 are turned off in response to the turned-off level of the third scanning signal line S3. The first transistor M1 provides a driving current to the first electrode of the light-emitting element D, and a driving current of the third transistor M3 is transmitted to the first electrode of the light-emitting element D through the fourth transistor M4. The first transistor M1 and the third transistor M3 jointly drive the light-emitting element D to emit light.

In a related art, there are many transistors on the driving branches between the voltage signal line VDD of the first power supply and the voltage signal line VSS of the second power supply, and each transistor divides a voltage, meaning each transistor generates a specific voltage drop. To maintain an expected brightness of the light-emitting element D after division by a plurality of transistors, a relatively large voltage difference (e.g., cross-voltage) between a voltage signal of a first power supply and a voltage signal of a second power supply is required, resulting in a large power consumption.

In some embodiments, there may be only the first driving module 101 (the first transistor M1) on the first driving branch L1, and there may be only the second driving module 103 (the third transistor M3) and the first switch module 104 (the fourth transistor M4) on the second driving branch L2. That is, number of transistors on the first driving branch L1 and/or the second driving branch L2 is reduced, so the voltage division of the transistors on the first driving branch L1 and/or the second driving branch L2 can be reduced, which is conducive to reducing the cross-voltage between the voltage signal of the first power supply and the voltage signal of the second power supply and reducing the power consumption.

Figure 8:
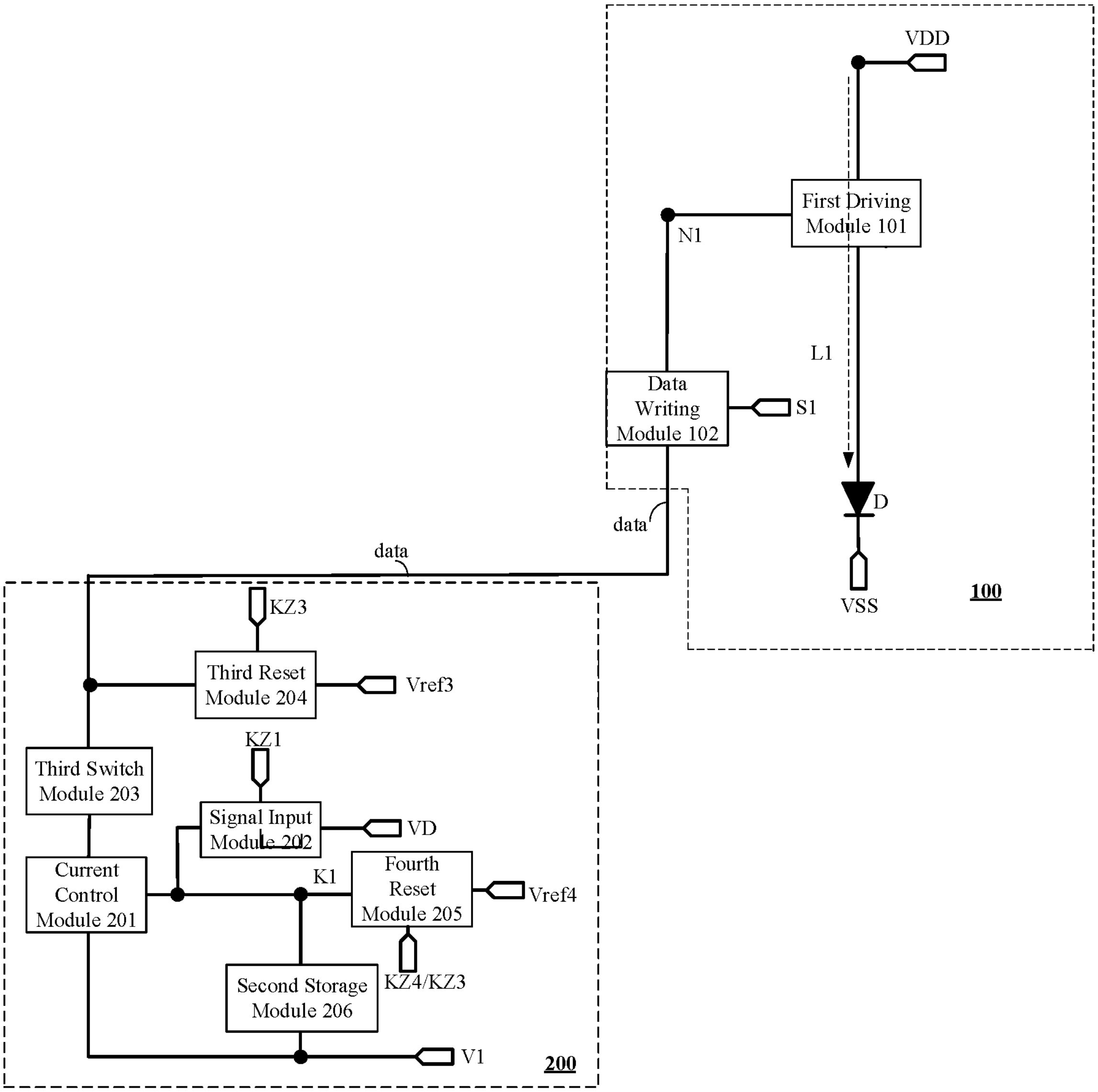
FIG. 8 illustrates a circuit connection diagram between a pixel circuit and a current source circuit consistent with various embodiments of the present disclosure.

FIG. 8 illustrates a circuit connection diagram of a pixel circuit and a current source circuit consistent with various embodiments of the present disclosure. As shown in FIG. 8, in some embodiment, optionally, the data signal with a controllable current value transmitted by the data signal line “data” can be provided by a current source circuit 200.

Specifically, the data signal line “data” may be electrically connected to the current source circuit 200, and the current source circuit 200 may provide a data signal to the pixel circuit 100 through the data signal line “data”. The current source circuit 200 may include a current control module 201 and a signal input module 202.

A control end of the current control module 201 is electrically connected to a first control node K1, and a first end of the current control module 201 is electrically connected to a voltage signal line V1 of a third power supply. In some examples, a potential of a voltage signal transmitted by the voltage signal line V1 of the third power supply may be greater than OV. In other embodiments, the potential of the voltage signal transmitted by the voltage signal line V1 of the third power supply may be less than OV, which is not limited herein.

The signal input module 202 can be electrically connected to a current control signal end VD and the current control module 201 respectively. The signal input module 202 is configured to write a current control signal at the current control signal end VD into the first control node K1, so that the first control node K1 achieves a target potential. A magnitude of the target potential can be adjusted flexibly according to actual needs, which is not limited herein.

The current control module 201 is turned on under a control of the first control node K1 at the target potential, and outputs an electrical signal driven by the voltage signal from the voltage signal line V1 of the third power supply. The data signal may include an electrical signal output by the current control module 201. The magnitude of the target potential may affect a current magnitude of the electrical signal output by the current control module 201. By adjusting the target potential of the first control node K1, a current of the electrical signal output by the current control module 201 can be adjusted. Therefore, the current source circuit 200 includes the current control module 201 and the signal input module 202. The current control module 201 can be turned on under a control of the first control node K1 at the target potential and output a data signal (electrical signal) with an expected current, so that the current source circuit 200 can transmit the data signal (electrical signal) with a controllable current value to the data signal line "data", which is conducive to making the voltage drop of the data signal on the data signal line "data" controllable.

Because of a current sink problem, when a transistor type of the first driving module 101 in the pixel circuit 100 is same as a transistor type of the current control module 201 in the current source circuit 200, writing the data signal output by the current source circuit 200 into the pixel circuit 100 may be challenging.

Figure 9:
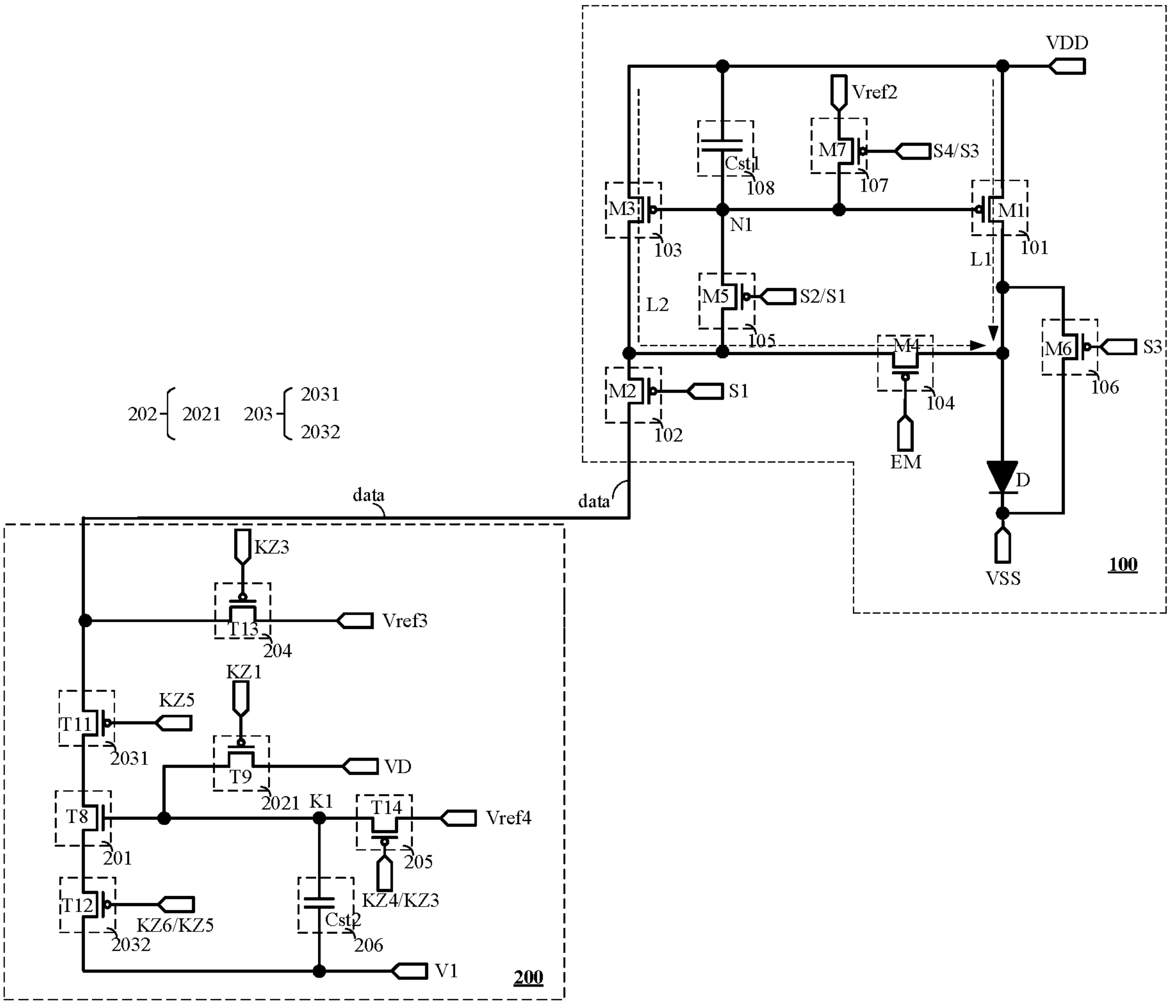
FIG. 9 illustrates another circuit connection diagram between a pixel circuit and a current source circuit consistent with various embodiments of the present disclosure.

In view of the above, in some embodiments, the transistor type of the first driving module 101 in the pixel circuit 100 and the transistor type of the current control module 201 in the current source circuit 200 may be different. FIG. 9 illustrates another circuit connection diagram of a pixel circuit and a current source circuit consistent with various embodiments of the present disclosure. As shown in FIG. 9, in some embodiments, optionally, the first driving module 101 may include a P-type transistor, and the current control module 201 may include an N-type transistor.

Since the first driving module 101 is a P-type transistor and the current control module 201 is an N-type transistor, and the transistor types of the first driving module 101 and the current control module 201 are different, the current sink problem can be better improved, so that the data signal output by the current source circuit 200 is better written into the pixel circuit 100.

Referring to FIG. 3, in some embodiments, optionally, the pixel circuit 100 may further include the second driving module 103, and both the first driving module 101 and the second driving module 103 may include a same type of transistor. For example, when the first driving module 101 is a P-type transistor, the second driving module 103 may also be a P-type transistor.

In some other embodiments, optionally, the first driving module 101 may include an N-type transistor, and the current control module 201 may include a P-type transistor. Since the first driving module 101 is an N-type transistor and the current control module 201 is a P-type transistor, and the transistor types of the first driving module 101 and the current control module 201 are different, the current sink problem can be better improved, so that the data signal output by the current source circuit 200 is better written into the pixel circuit 100.

In addition, a current voltage range of a signal output by a driver chip is generally based on an operating voltage range of a P-type transistor. Therefore, if the current control module 201 is a P-type transistor, a current control signal with an expected potential can be supplied to the current control signal end VD using a commonly used driver chip, without a need for customizing the driver chip, thereby reducing production costs.

In some other embodiments, optionally, the pixel circuit 100 may further include the second driving module 103, and both the first driving module 101 and the second driving module 103 may include a same type of transistor. For example, when the first driving module 101 is an N-type transistor, the second driving module 103 may also be an N-type transistor.

Referring to FIG. 8 and FIG. 9, in some embodiments, optionally, the signal input module 202 may include a signal input unit 2021. A control end of the signal input unit 2021 is electrically connected to a first control signal line KZ1, a first end of the signal input unit 2021 is electrically connected to the current control signal end VD and a second end of the signal input unit 2021 is electrically connected to the control end of the current control module 201. During a current control signal writing phase when the signal input unit 2021 is turned on, a current control signal at the current control signal end VD can be written into the first control node K1 through the signal input unit 2021, so that the first control node K1 achieves the target potential.

Figure 10:
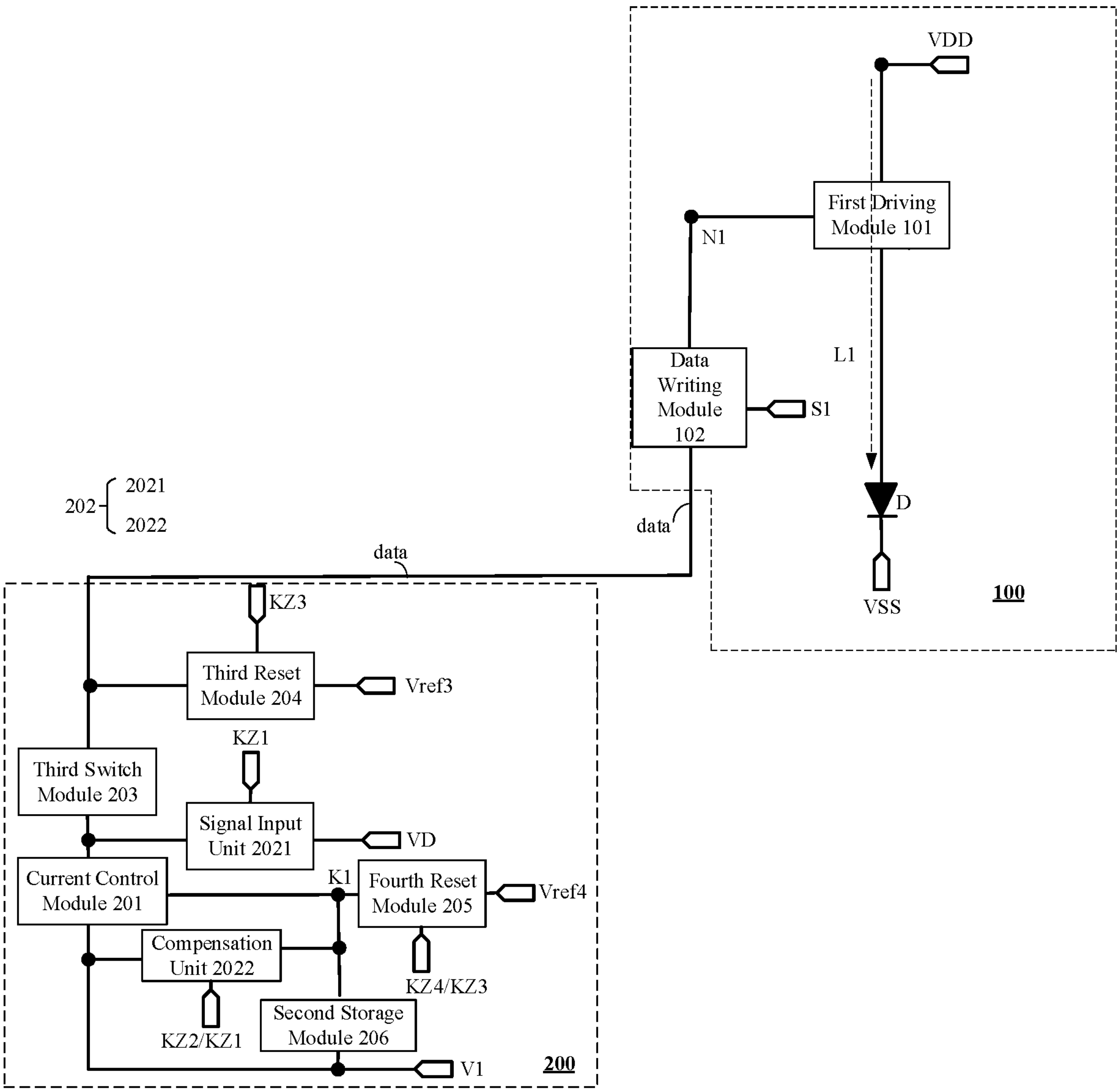
FIG. 10 illustrates another circuit connection diagram between a pixel circuit and a current source circuit consistent with various embodiments of the present disclosure.

FIG. 10 illustrates another circuit connection diagram of a pixel circuit and a current source circuit consistent with various embodiments of the present disclosure. As shown in FIG. 10, different from the embodiments shown in FIG. 8 and FIG. 9, in some embodiments, optionally, the control end of the signal input unit 2021 is electrically connected to the first control signal line KZ1, the first end of the signal input unit 2021 is electrically connected to the current control signal end VD, and the second end of the signal input unit 2021 may be electrically connected to a second end of the current control module 201. The signal input module 202 may also include a compensation unit 2022. A control end of the compensation unit 2022 may be electrically connected to a second control signal line KZ2, a first end of the compensation unit 2022 may be electrically connected to the first end of the current control module 201, and a second end of the compensation unit 2022 may be electrically connected to the first control node K1.

During the current control signal writing phase when the signal input unit 2021 and the compensation unit 2022 are turned on, a current control signal at the current control signal end VD is sequentially written into the first control node K1 through the signal input unit 2021, the current control module 201 and the compensation unit 2022 and compensates a threshold voltage of the current control module 201. Specifically, the control end of the current control module 201 and the first end of the current control module 201 are connected through the compensation unit 2022. When a potential of the control end (first control node K1) of the current control module 201 differs from a potential of the second end of the current control module 201 by Vth1, that is, when a potential of the first control node K1 differs from the potential of the current control signal by Vth1, the current control module 201 is turned off, and writing of the current control signal is completed. Vth1 represents the threshold voltage of the current control module 201. Therefore, the signal input module 202 includes the signal input unit 2021 and the compensation unit 2022. Through a cooperation of the signal input unit 2021 and the compensation unit 2022, not only the writing of the current control signal can be realized, but also the threshold voltage of the current control module 201 can be compensated, thereby reducing an impact of the threshold voltage of the current control module 201 on a current of a data signal (electrical signal) output by the current control module 201 and improving an accuracy of the current of the data signal output by the current control module 201.

As shown in FIG. 8, FIG. 9 or FIG. 10, in some embodiments, optionally, the current source circuit 200 may further include a third switch module 203, a third reset module 204, a fourth reset module 205, and a second storage module 206. The third switch module 203 may be connected in series with the current control module 201, and the third switch module 203 may be configured to be turned on during a first data writing phase when the current control module 201 outputs a data signal. In some embodiments, the third switch module 203 may be electrically connected between the second end of the current control module 201 and the data signal line "data", and/or the third switch module 203 may be electrically connected to the first end of the current control module 201 between the end and the voltage signal line V1 of the third power supply. Therefore, during the first data writing phase, the current control module 201 and the third switch module 203 are turned on, and the data signal with a controllable current value output by the current control module 201 can be transmitted to the pixel circuit 100 through the data signal line "data".

A control end of the third reset module 204 is electrically connected to a third control signal line KZ3, a first end of the third reset module 204 is electrically connected to a third reset signal line Vref3, and a second end of the third reset module 204 is electrically connected to the data signal line "data". The third reset module 204 can be configured to reset the data signal line "data". For example, before the current control module 201 transmits a data signal to the data signal line "data", the third reset module 204 can be turned on under a control of the third control signal line KZ3 and transmit a third reset signal from the third reset signal line Vref3 to the data signal line "data" to reset and pre-charge the data signal line "data". Therefore, on the one hand, resetting the data signal line "data" can ensure a subsequent data signal to be successfully written into the data signal line "data", on the other hand, pre-charging the data signal line "data" is conducive to compensating or reducing an impact of the resistance-capacitance effect on the data signal line "data" on a writing (charging) of a data signal by the pixel circuit.

A control end of the fourth reset module 205 is electrically connected to a fourth control signal line KZA, a first end of the fourth reset module 205 is electrically connected to a fourth reset signal line Vref4, and a second end of the fourth reset module 205 is electrically connected to the first control node K1. The fourth reset module 205 may be configured to reset the first control node K1. For example, before a current control signal is written into the first control node K1, the fourth reset module 205 can be turned on under a control of the fourth control signal line KZ4 and transmits the fourth reset signal of the fourth reset signal line Vref4 to the first control node K1 to reset the first control node K1. Therefore, before the current control signal is written to the first control node K1, resetting the first control node K1 can ensure that a subsequent current control signal is successfully written into the first control node K1, so that the potential of the first control node K1 achieves the target potential.

A first end of the second storage module 206 may be electrically connected to the first control node K1, and a second end of the second storage module 206 may be electrically connected to the signal line V1 of the third power supply. The second storage module 206 may be configured to maintain the potential of the first control node K1. Therefore, when the current control module 201 outputs the data signal, the second storage module 206 maintains the potential of the first control node K1, so that the current control module 201 can continue to output a data signal with a relatively stable current.

Figure 11:
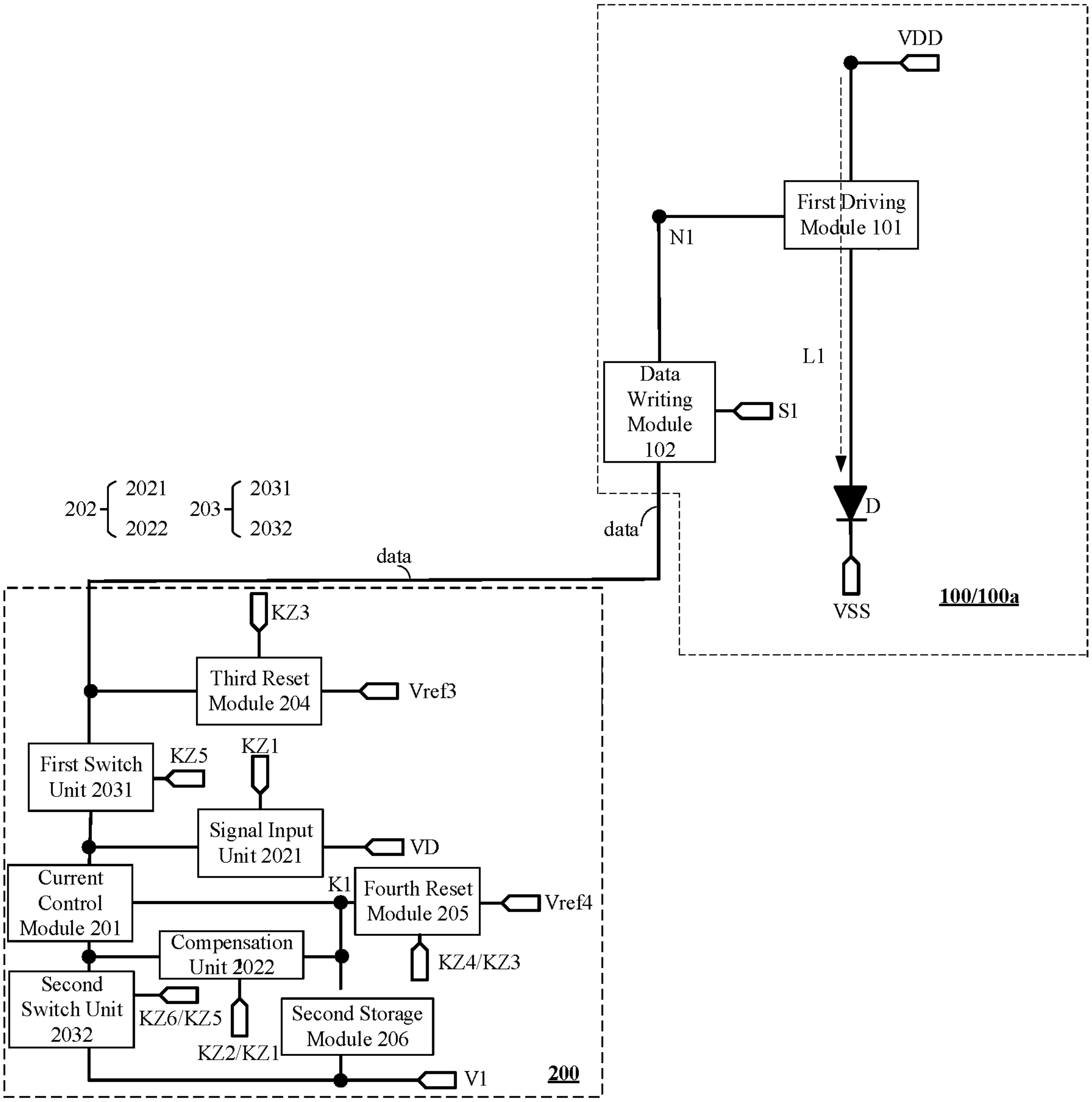
FIG. 11 illustrates another circuit connection diagram between a pixel circuit and a current source circuit consistent with various embodiments of the present disclosure.

FIG. 11 illustrates another circuit connection diagram of a pixel circuit and a current source circuit consistent with various embodiments of the present disclosure. As shown in FIG. 11, in some embodiments, optionally, the third switch module 203 may include a first switch unit 2031 and a second switch unit 2032. A control end of the first switch unit 2031 may be electrically connected to a fifth control signal line KZ5, a first end of the first switch unit 2031 is electrically connected to the second end of the current control module 201 and a second end of the first switch unit 2031 is electrically connected to the data signal line "data". The first switch unit 2031 may be configured to be turned off during the current control signal writing phase when the signal input module 202 is turned on. During the current control signal writing phase, the first switch unit 2031 is turned off under a control of the fifth control signal line KZ5, which can effectively prevent the current control signal at the current control signal end VD from being transmitted to the data signal line "data".

A control end of the second switch unit 2032 may be electrically connected to a sixth control signal line KZ6, a first end of the second switch unit 2032 may be electrically connected to the first end of the current control module 201, and a second end of the second switch unit 2032 may be electrically connected to the voltage signal line V1 of the third power supply. The second switch unit 2032 can also be configured to be turned off during the current control signal writing phase when the signal input module 202 is turned on. Therefore, during the current control signal writing phase, the second switch unit 2032 is turned off under a control of the sixth control signal line KZ6, which can effectively prevent the voltage signal from the voltage signal line V1 of the third power supply from being written into the first control node K1 through the second switch unit 2032, thereby reducing interference with the writing of the current control signal and better ensuring that the potential of the first control node K1 can achieve the target potential.

Figure 12:
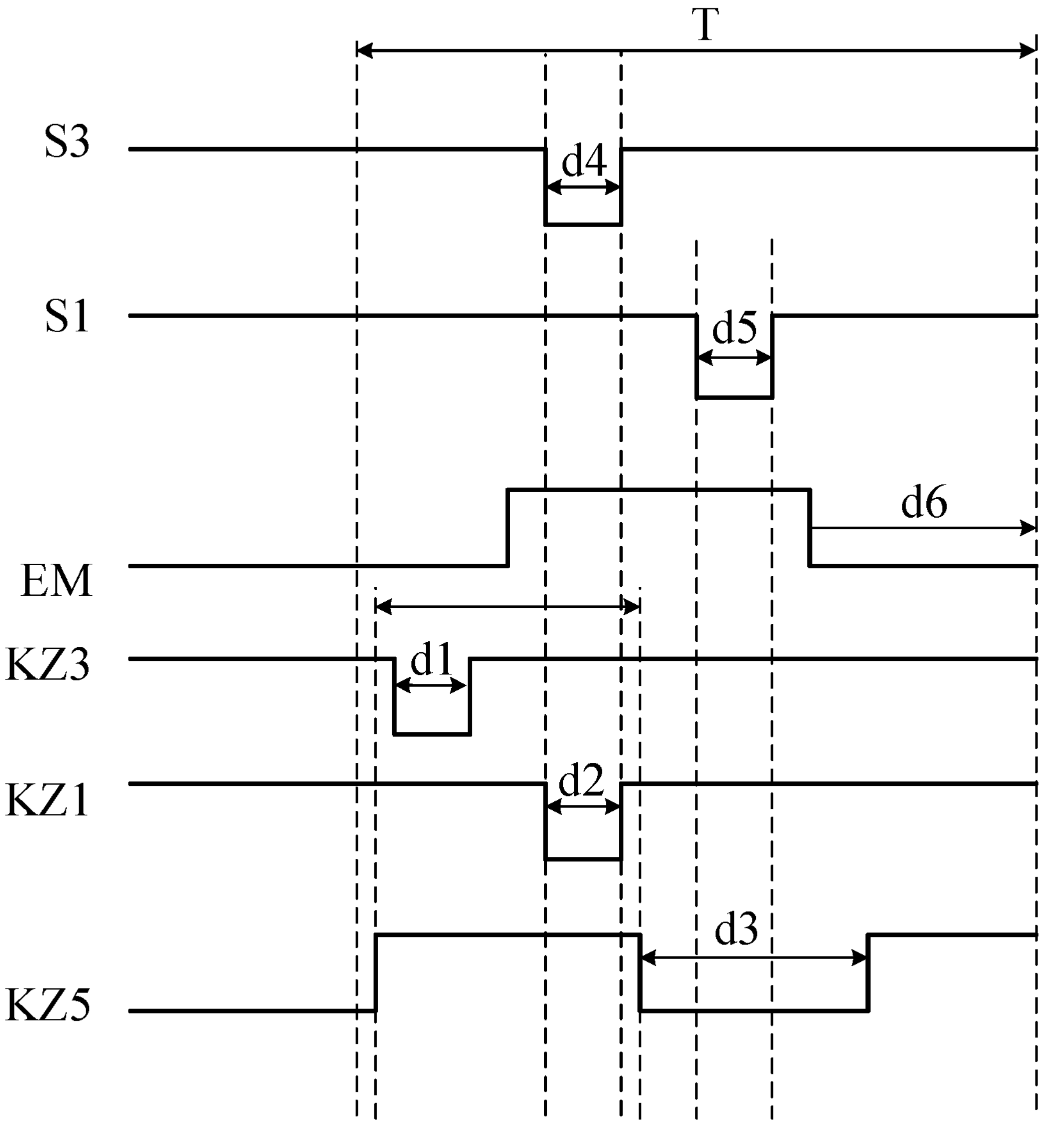
FIG. 12 illustrates another driving timing diagram between a pixel circuit and a current source circuit consistent with various embodiments of the present disclosure.

FIG. 12 illustrates another driving timing diagram of a pixel circuit consistent with various embodiments of the present disclosure. Referring to FIG. 11 and FIG. 12, in some embodiments, optionally, the pixel circuit 100 includes a target pixel circuit 100*a*. The target pixel circuit 100*a* may be any pixel circuit. A period T, during which the current source circuit 200 supplies the target pixel circuit 100*a* with a data signal, may include a first reset phase d1, a current control signal writing phase d2 and a first data writing phase d3 arranged in chronological order. A working process of the target pixel circuit 100*a* may further include a second reset phase d4, a second data writing phase d5 and a light emitting phase d6 arranged in chronological order. The first data writing phase d3 at least partially overlaps the second data writing phase d5.

Referring to FIG. 11 and FIG. 12, during the first reset phase d1, the third reset module 204 is turned on, and transmits a third reset signal of the third reset signal line Vref3 to the data signal line "data" to reset the data signal line "data". During the first reset phase d1, the fourth reset module 205 is turned on, and transmits a fourth reset signal of the fourth reset signal line Vref4 to the first control node K1 to reset the first control node K1.

During the current control signal writing phase d2, the signal input module 202 is turned on, and the signal input module 202 can write the current control signal at the current control signal end VD into the first control node K1, so that the first control node K1 achieves the target potential.

During the first data writing phase d3, the current control module 201 is turned on under a control of the first control node K1 at the target potential, and outputs an electrical signal driven by the voltage signal of the third power supply from the voltage signal line V1 of the third power supply. A data signal includes an electrical signal output by the current control module 201. The electrical signal (e.g., a data signal) output by the current control module 201 is transmitted to the target pixel circuit 100*a* through the data signal line "data".

During the second reset phase d4, a target node in the target pixel circuit 100*a* is reset. For example, the target node in the target pixel circuit 100*a* may include the first node N1 as shown in FIG. 11 and/or the first electrode of the light emitting element D, etc.

During the second data writing phase d5, the data writing module 102 in the target pixel circuit 100*a* is turned on under a control of the first scanning signal line S1 and transmits the data signal from the data signal line "data" to the first node N1.

During the light-emitting phase d6, the first driving module 101 in the target pixel circuit 100*a* is turned on, and the first driving branch L1 in the target pixel circuit 100*a* drives the light-emitting element D to emit light.

Figure 13:
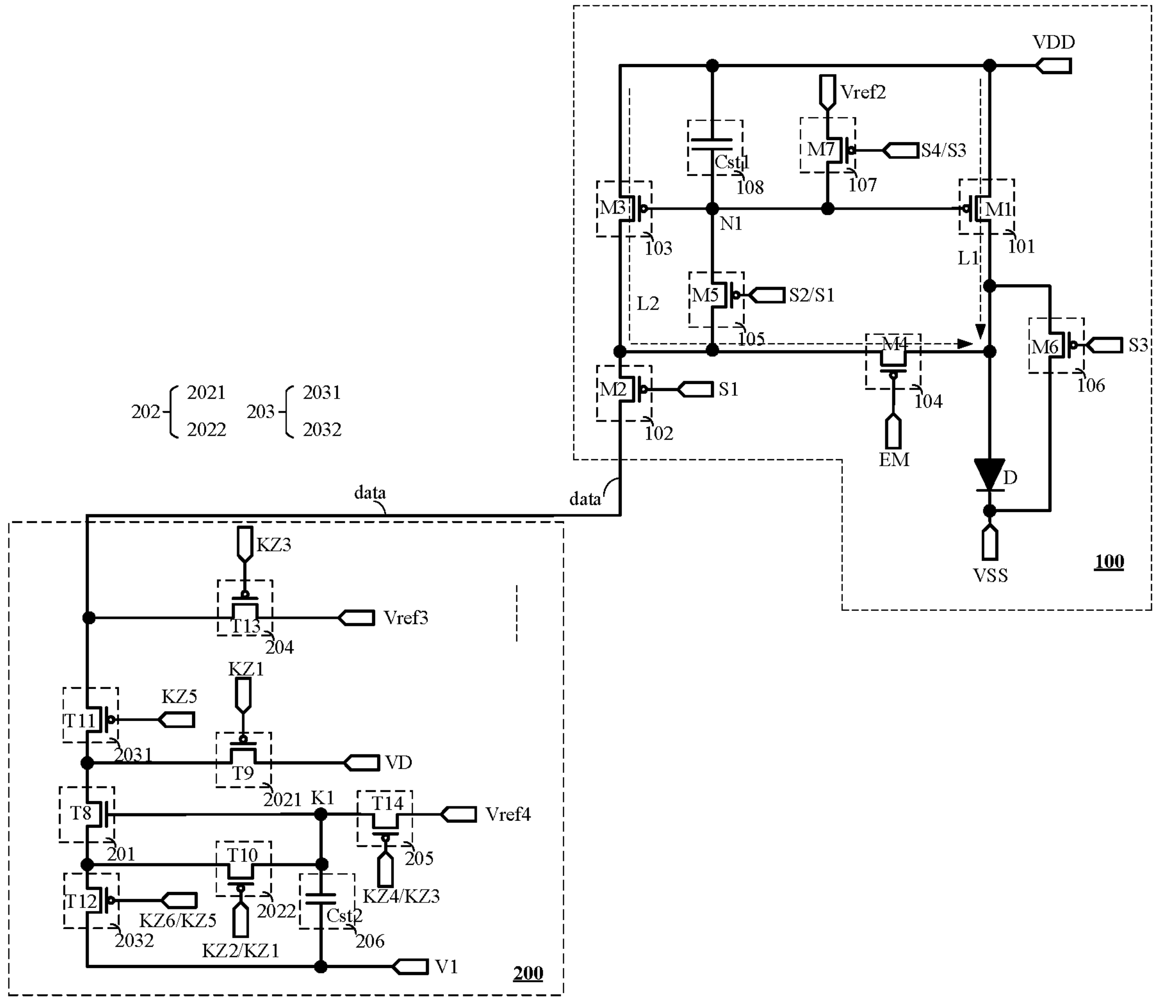
FIG. 13 illustrates another circuit connection diagram between a pixel circuit and a current source circuit consistent with various embodiments of the present disclosure.
Figure 14:
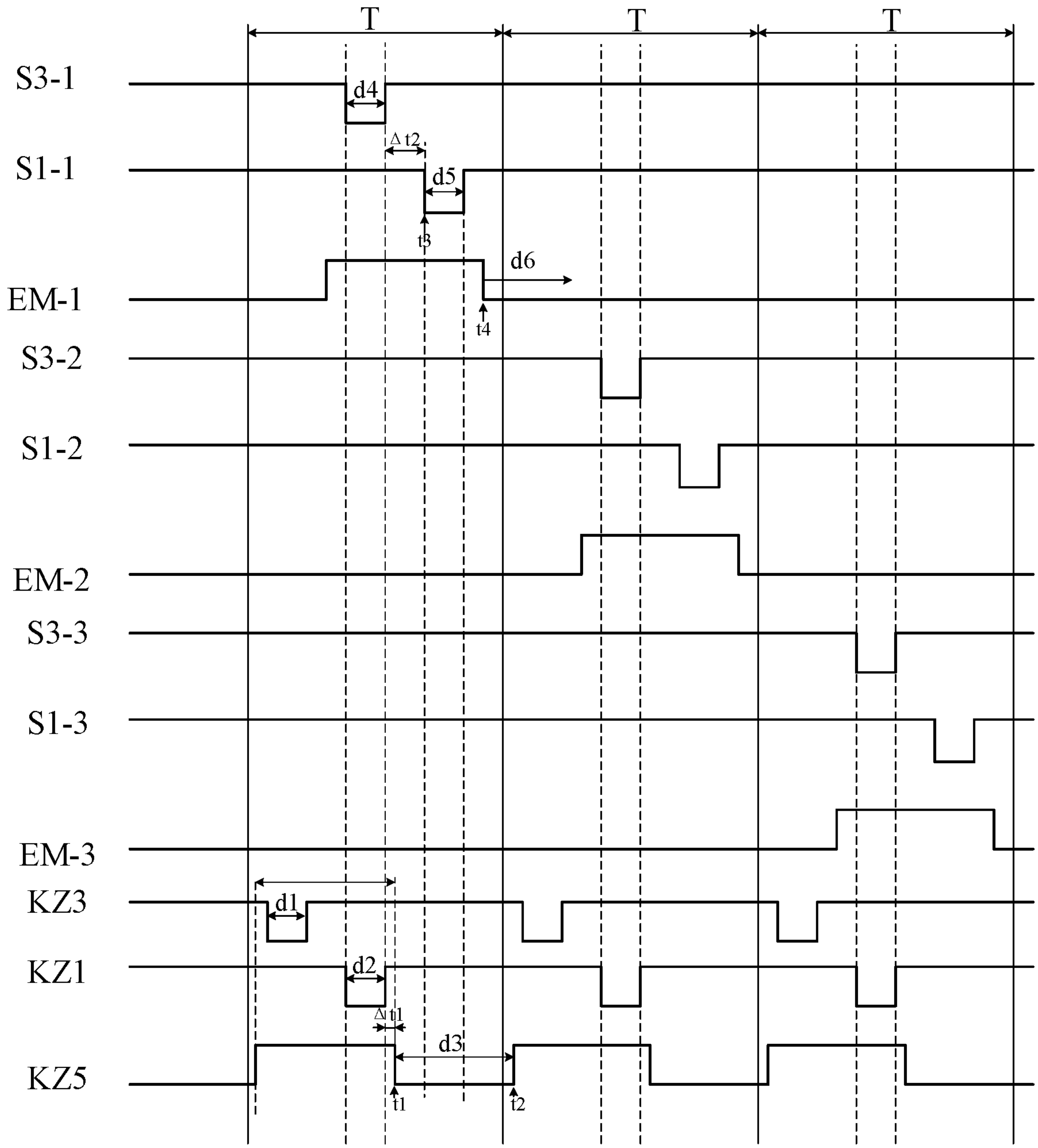
FIG. 14 illustrates another driving timing diagram between a pixel circuit and a current source circuit consistent with various embodiments of the present disclosure.

FIG. 13 illustrates another circuit connection diagram of a pixel circuit and a current source circuit consistent with various embodiments of the present disclosure. FIG. 14 illustrates another driving timing diagram of a pixel circuit consistent with various embodiments of the present disclosure. FIG. 14 shows an operating timing of a multi-row pixel circuit. For example, S1-1 represents the first scanning signal line S1 connected to the pixel circuit in a first row, S3-1 represents the third scanning signal line S3 connected to the pixel circuit in the first row, and EM-1 represents the light-emitting control signal line EM connected to the pixel circuit in the first row. For example, S1-2 represents the first scanning signal line S1 connected to the pixel circuit in a second row, S3-2 represents the third scanning signal line S3 connected to the pixel circuit in the second row, and EM-2 represents the light-emitting control signal line EM connected to the pixel circuit of the second row. For example, S1-3 represents the first scanning signal line S1 connected to the pixel circuit in a third row, S3-3 represents the third scanning signal line S3 connected to the pixel circuit in the third row, and EM-3 represents the light-emitting control signal line EM connected to the pixel circuit in the third row.

In one embodiment shown in FIGS. 13 and 14, the second scanning signal line S2 may be multiplexed as the first scanning signal line S1, and the fourth scanning signal line S4 may be multiplexed as the third scanning signal line S3. The second control signal line KZ2 can be multiplexed as the first control signal line KZ1, the fourth control signal line KZ4 can be multiplexed as the third control signal line KZ3, and the sixth control signal line KZ6 can be multiplexed as the fifth control signal line KZ5.

Referring to FIG. 13 and FIG. 14, in some embodiments, optionally, the pixel circuit 100 may include the first driving module 101, the data writing module 102, the second driving module 103, the first switch module 104, the second switch module 105, the first reset module 106, the second reset module 107 and the first storage module 108. The first driving module 101 may include the first transistor M1, the data writing module 102 may include the second transistor M2, the second driving module 103 may include the third transistor M3, the first switch module 104 may include the fourth transistor M4, the switch module 105 may include the fifth transistor M5, the first reset module 106 may include the sixth transistor M6, the second reset module 107 may include the seventh transistor M7, and the first storage module 108 may include the first storage capacitor Cst1.

A connection method of each module in the pixel circuit 100 has been described in detail during the above introduction of FIG. 11, which is not repeated herein.

Referring to FIG. 13 and FIG. 14, in some embodiments, optionally, the current source circuit 200 may include the current control module 201, the signal input module 202, the third switch module 203, the third reset module 204, the fourth reset module 205 and the second storage module 206. The signal input module 202 may include the signal input unit 2021 and the compensation unit 2022, and the third switch module 203 may include the first switch unit 2031 and the second switch unit 2032.

The current control module 201 may include an eighth transistor T8, the signal input unit 2021 may include a ninth transistor T9, the compensation unit 2022 may include a tenth transistor T10, the first switch unit 2031 may include an eleventh transistor T11, the second switch unit 2032 may include a twelfth transistor T12, the third reset module 204 may include a thirteenth transistor T13, the fourth reset module 205 may include a fourteenth transistor T14, and the second storage module 206 may include a second storage capacitor Cst2. A connection method of each transistor in the current source circuit 200 can be referenced from the earlier description of the connection method for each module/unit in the current source circuit 200, which is not repeated herein.

Referring to FIG. 13 and FIG. 14, taking the target pixel circuit as any pixel circuit 100 in the first row of pixel circuits as an example, a period T, during which the current source circuit 200 supplies the target pixel circuit 100 with a data signal, may include the first reset phase d1, the current control signal writing phase d2 and the first data writing phase d3 arranged in chronological order. A working process of the pixel circuit 100 may further include the second reset phase d4, the second data writing phase d5 and the light emitting phase d6 arranged in chronological order. The first data writing phase d3 at least partially overlaps the second data writing phase d5.

Referring to FIG. 13 and FIG. 14, during the first reset phase d1, the thirteenth transistor T13 is turned on under a control of the third control signal line KZ3, and the thirteenth transistor T13 transmits the third reset signal of the third reset signal line Vref3 to rest the data signal line "data". During the first reset phase d1, the fourteenth transistor T14 is turned on under a control of the third control signal line KZ3, and the fourteenth transistor T14 transmits the fourth reset signal from the fourth reset signal line Vref4 to reset the first control node K1. During the current control signal writing phase d2, the ninth transistor T9 and the tenth transistor T10 are turned on under a control of the first control signal line KZ1, and the current control signal at the current control signal end VD is sequentially written into the first control node K1 through the ninth transistor T9, the eighth transistor T8, and the tenth transistor T10, so that the first control node K1 achieves the target potential.

During the first data writing phase d3, the eighth transistor T8 is turned on under a control of the first control node K1 at the target potential, and the eleventh transistor T11 and the twelfth transistor T12 are under a control of the fifth control signal line KZ5 is turned on, and the eighth transistor T8 outputs an electrical signal driven by a voltage signal from the voltage signal line V1 of the third power supply. A data signal includes an electrical signal output by the eighth transistor T8. The electrical signal (e.g., a data signal) output by the eighth transistor T8 is transmitted to the data signal line "data" through the eleventh transistor T11.

During the second reset phase d4, the sixth transistor M6 and the seventh transistor M7 are turned on in response to the turned-on level of the third scanning signal line S3, the second transistor M2 and the fifth transistor M5 are turned on in response to the turned-on level of the first scanning signal line S1, and the fourth transistor M4 is turned off in response to the turned-off level of the light-emitting control signal line EM. The sixth transistor M6 may transmit the voltage signal from the voltage signal line VSS of the second power supply to the first electrode of the light-emitting element D to reset the first electrode of the light-emitting element D. The seventh transistor M7 may transmit the second reset signal of the second reset signal line Vref2 to the first node N1 to reset the first node N1.

During the second data writing phase d5, the second transistor M2 and the fifth transistor M5 are turned on in response to the turned-on level of the first scanning signal line S1, the fourth transistor M4 is turned off in response to the turned-off level of the light-emitting control signal line EM and the sixth transistor M6 and the seventh transistor M7 are turned off in response to the turned-off level of the third scanning signal line S3. The data signal of the data signal line "data" is sequentially written into the first node N1 through the second transistor M2 and the fifth transistor M5. The first storage capacitor Cst1 maintains the potential of the first node N1.

During the light emitting phase d6, the first transistor M1 and the third transistor M3 are turned on in response to the turned-on level of the first node N1, and the second transistor M2 and the fifth transistor M5 are turned off in response to the turned-off level of the first scanning signal line S1, the fourth transistor M4 is turned on in response to the on level of the light-emitting control signal line EM, and the sixth transistor M6 and the seventh transistor M7 are turned off in response to the off level of the third scanning signal line S3. The first transistor M1 supplies a driving current to the first electrode of the light-emitting element D, and the driving current of the third transistor M3 is transmitted to the first electrode of the light-emitting element D through the fourth transistor M4. The first transistor M1 and the third transistor M3 jointly drive the light-emitting element D to emit light.

Referring to FIG. 14, in some embodiments, optionally, a starting time t1 of the first data writing phase d3 may be earlier than a starting time t3 of the second data writing phase d5, and a duration of the first data writing phase d3 is longer than a duration of the second data writing phase d5. And/or, an end time t2 of the first data writing phase d3 may be later than a start time t4 of the light emitting phase d6. Therefore, the starting time t1 of the first data writing phase d3 is earlier than the starting time t3 of the second data writing phase d5. The data signal supplied by the current source circuit 200 can be written into the data signal line "data" in advance to ensure a sufficient duration for the data signal from the data signal line "data" to be written into the pixel circuit 100. And/or, the end time t2 of the first data writing phase d3 is later than the start time t4 of the light emitting phase d6, which can ensure a sufficient duration for the data signal from the data signal line "data" to be written into the pixel circuit 100.

Referring to FIG. 14, in some embodiments, optionally, the current control signal writing phase d2 may at least partially overlap the second reset phase d4. In some embodiments, the current control signal writing phase d2 may completely overlap the second reset phase d4. And/or, a first time interval At1 between the current control signal writing phase d2 and the first data writing phase d3 may be less than or equal to a second time interval At2 between the second reset phase d4 and the second data writing phase d5. Therefore, the first time interval At1 between the current control signal writing phase d2 and the first data writing phase d3 is relatively small, which can reduce a leakage time of a transistor, such as the fourteenth transistor T14 in the current source circuit 200, maintain a potential stability of the first control node K1 and better ensures that the current value of the data signal provided by the current source circuit 200 can achieve the expected current.

Figure 15:
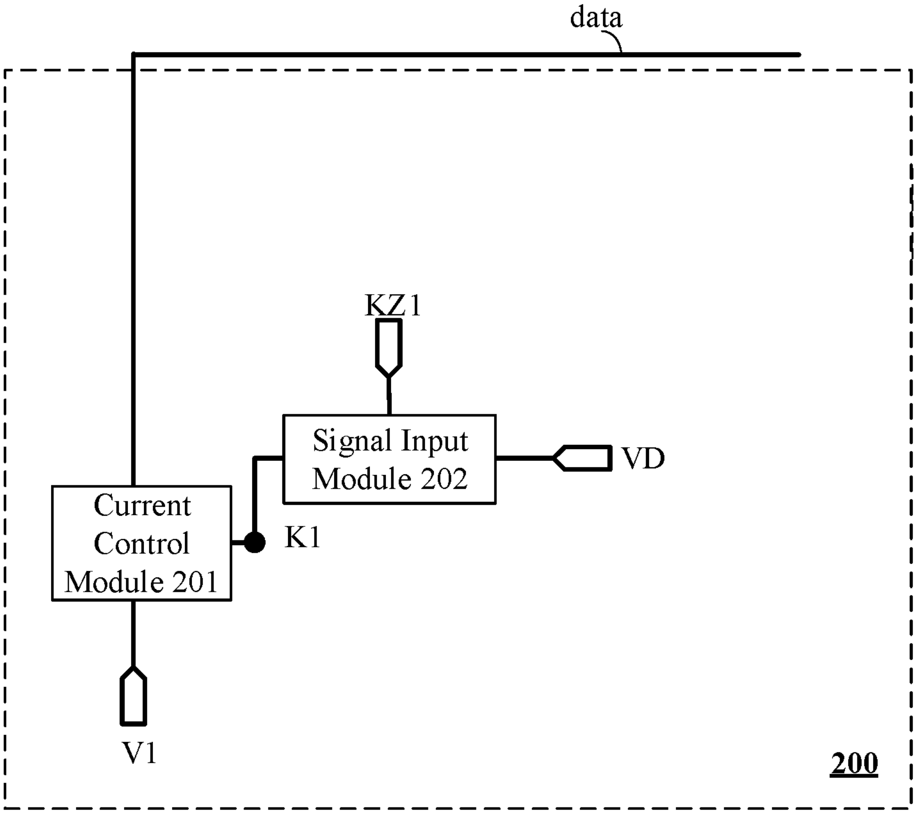
FIG. 15 illustrates a circuit connection diagram of a current source circuit consistent with various embodiments of the present disclosure.

The present disclosure also provides a current source circuit, which may include the current source circuit 200 provided in the above embodiments. FIG. 15 illustrates a circuit connection diagram of a current source circuit consistent with various embodiments of the present disclosure. As shown in FIG. 15, the current source circuit 200 may include the current control module 201 and the signal input module 202.

The control end of the current control module 201 can be electrically connected to the first control node K1, the first end of the current control module 201 can be electrically connected to the voltage signal line V1 of the third power supply, and the second end of the current control module 201 may be electrically connected to the data signal line "data". In some embodiments, the potential of the voltage signal transmitted by the signal line V1 of the third power voltage may be greater than OV, in other embodiments, the potential of the voltage signal transmitted by the signal line V1 of the third power voltage may be less than OV, which is not limited herein.

The signal input module 202 can be electrically connected to the current control signal end VD and the current control module 201 respectively. The signal input module 202 is configured to write the current control signal at the current control signal end VD into the first control node K1, so that the first control node K1 achieves the target potential. The magnitude of the target potential can be flexibly adjusted according to actual needs, which is not limited herein.

The current control module 201 is turned on under a control of the first control node K1 at the target potential, and outputs an electrical signal driven by the voltage signal provided by the voltage signal line V1 of the third power supply. A data signal may include an electrical signal output by the current control module 201. The magnitude of the target potential may affect the current magnitude of the electrical signal output by the current control module 201. By adjusting the target potential of the first control node K1, the current of the electrical signal output by the current control module 201 can be adjusted. Therefore, the current source circuit 200 includes the current control module 201 and the signal input module 202. The current control module 201 can be turned on under a control of the first control node K1 at the target potential and output a data signal (electrical signal) of an expected current value, so that the current source circuit 200 can transmit a data signal (electrical signal) with a controllable current value to the data signal line "data", which is conducive to making the voltage drop of the data signal on the data signal line "data" controllable.

It should be noted that a specific circuit structure of the current source circuit 200 has been described in detail above. The current source circuit may include the current source circuit 200 provided in any of the above embodiments, which is not repeated herein.

Figure 16:
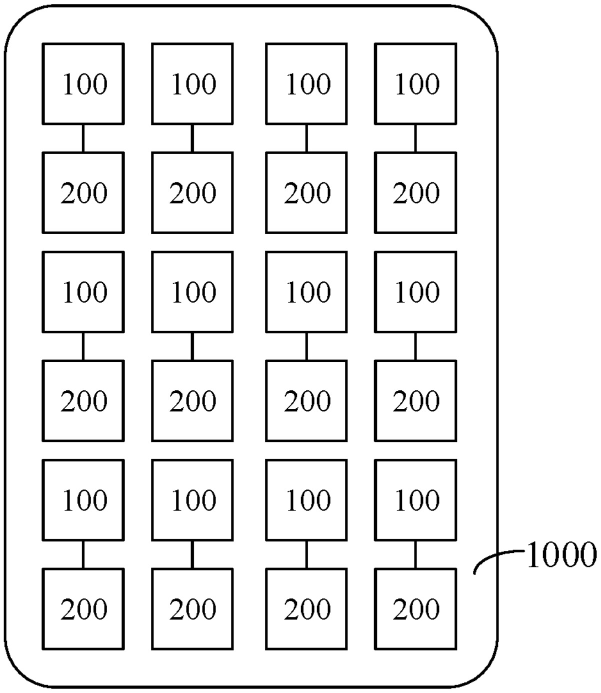
FIG. 16 illustrates a circuit connection diagram of a display module consistent with various embodiments of the present disclosure.

FIG. 16 illustrates a circuit connection diagram of a display module consistent with various embodiments of the present disclosure. As shown in FIG. 16, the present disclosure also provides a display module 1000. The display module 1000 may include the pixel circuit 100 s and the current source circuit 200 provided in any of the above embodiments. The current source circuit 200 may provide a data signal to the pixel circuit 100 through the data signal line "data".

The display module 1000 provided by one embodiment has beneficial effects of the pixel circuit 100 and/or the current source circuit 200 provided by the above embodiments. Details can be referenced to specific descriptions of the pixel circuit 100 and/or the current source circuit 200 in the above embodiments.

As shown in FIG. 16, in some embodiments, optionally, the display module 1000 may include a plurality of pixel circuits 100 and a plurality of current source circuits 200. A current source circuit 200 may be electrically connected to a pixel circuit 100 through the data signal line "data", and the current source circuit 200 may be configured to provide a data signal to the pixel circuit 100.

Figure 17:
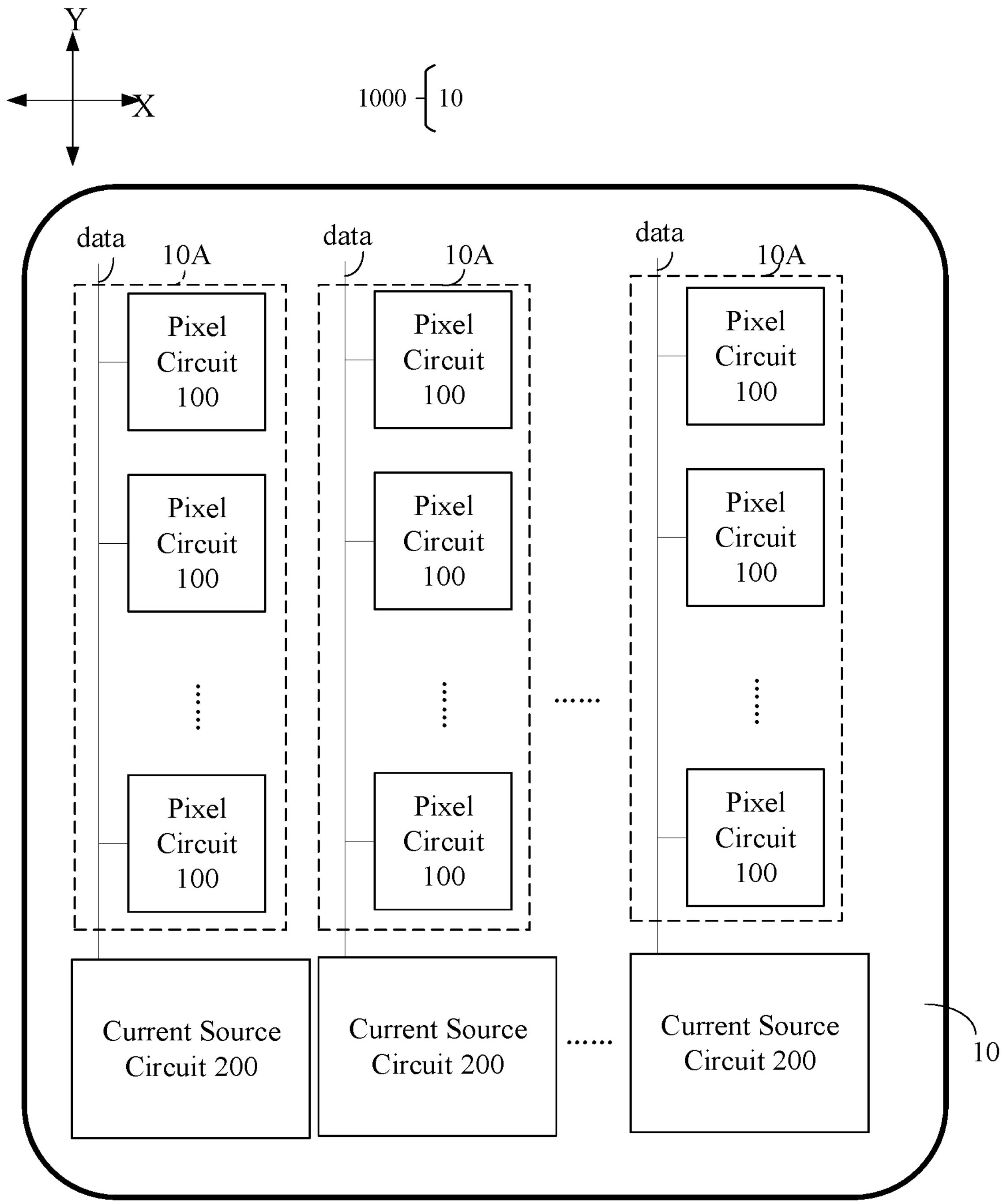
FIG. 17 illustrates another circuit connection diagram of a display module consistent with various embodiments of the present disclosure.

FIG. 17 illustrates another circuit connection diagram of a display module consistent with various embodiments of the present disclosure. As shown in FIG. 17, in some embodiments, optionally, the display module 1000 may include a plurality of data signal lines data extending along a first direction Y and arranged at intervals along a second direction X. The first direction Y intersects the second direction X. Exemplarily, FIG. 17 takes the first direction Y as a column direction and the second direction X as a row direction as an example. In other embodiments, the first direction Y can also be the row direction, and the second direction X can be the column direction, which is not limited herein.

The display module 1000 may include a plurality of current source circuits 200 and a plurality of pixel circuit groups 10A spaced apart along the second direction X. A pixel circuit group 10A may include a plurality of pixel circuits 100 spaced apart along the first direction Y.

A current source circuit 200 may be electrically connected to a plurality of pixel circuits 100 in a pixel circuit group 10A through a data signal line "data". A current source circuit 200 may be configured to provide data signals to the plurality of pixel circuits 100 in the pixel circuit group 10A. For example, when the first direction Y is the column direction, the pixel circuit group 10A may include a column of pixel circuits 100. A current source circuit 200 may be configured to supply data signals to a plurality of pixel circuits 100 in the column of pixel circuits 100.

Therefore, the current source circuit 200 is electrically connected to the plurality of pixel circuits 100 in the pixel circuit group 10A through a data signal line "data". The current source circuit 200 is configured to supply data signals to the plurality of pixel circuits 100 in the pixel circuit group 10A, which can reduce number of current source circuits 200 while ensuring that each pixel circuit 100 can receive a data signal and is conducive to simplifying a wiring design of the display module and reduce costs.

Referring to FIG. 17, in some embodiments, optionally, the current source circuit 200 may be configured to provide data signals to the plurality of pixel circuits 100 in the pixel circuit group 10A in a time-sharing manner according to an arrangement sequence of the plurality of pixel circuits 100 in the pixel circuit group 10A. For example, taking any pixel circuit group 10A as an example, the pixel circuit group 10A includes n pixel circuits 100 arranged at intervals along the first direction Y, and n is an integer greater than 1. The current source circuit 200 may sequentially provide data signals to the first pixel circuit 100 to n-th pixel circuit 100 in the pixel circuit group 10A. For example, the current source circuit 200 may first supply a data signal to the first pixel circuit 100 in the pixel circuit group 10A, the current source circuit 200 may supply a data signal to a second pixel circuit 100 in the pixel circuit group 10A, and so on until the current source circuit 200 provides a data signal to the n-th pixel circuit 100 in the pixel circuit group 10A.

Therefore, the current source circuit 200 sequentially provides data signals to the plurality of pixel circuits 100 in the pixel circuit group 10A in a time-sharing manner according to an arrangement order of the plurality of pixel circuits 100 in the pixel circuit group 10A, so that different pixel circuits 100 in the pixel circuit group 10A can receive different or same data signals, which is conducive to supporting the display module to display complex images.

Referring to FIG. 17, in some embodiments, optionally, the display module 1000 may include a display panel 10. The pixel circuits 100 may be on the display panel 10, and the current source circuits 200 may also be on the display panel 10.

Figure 18:
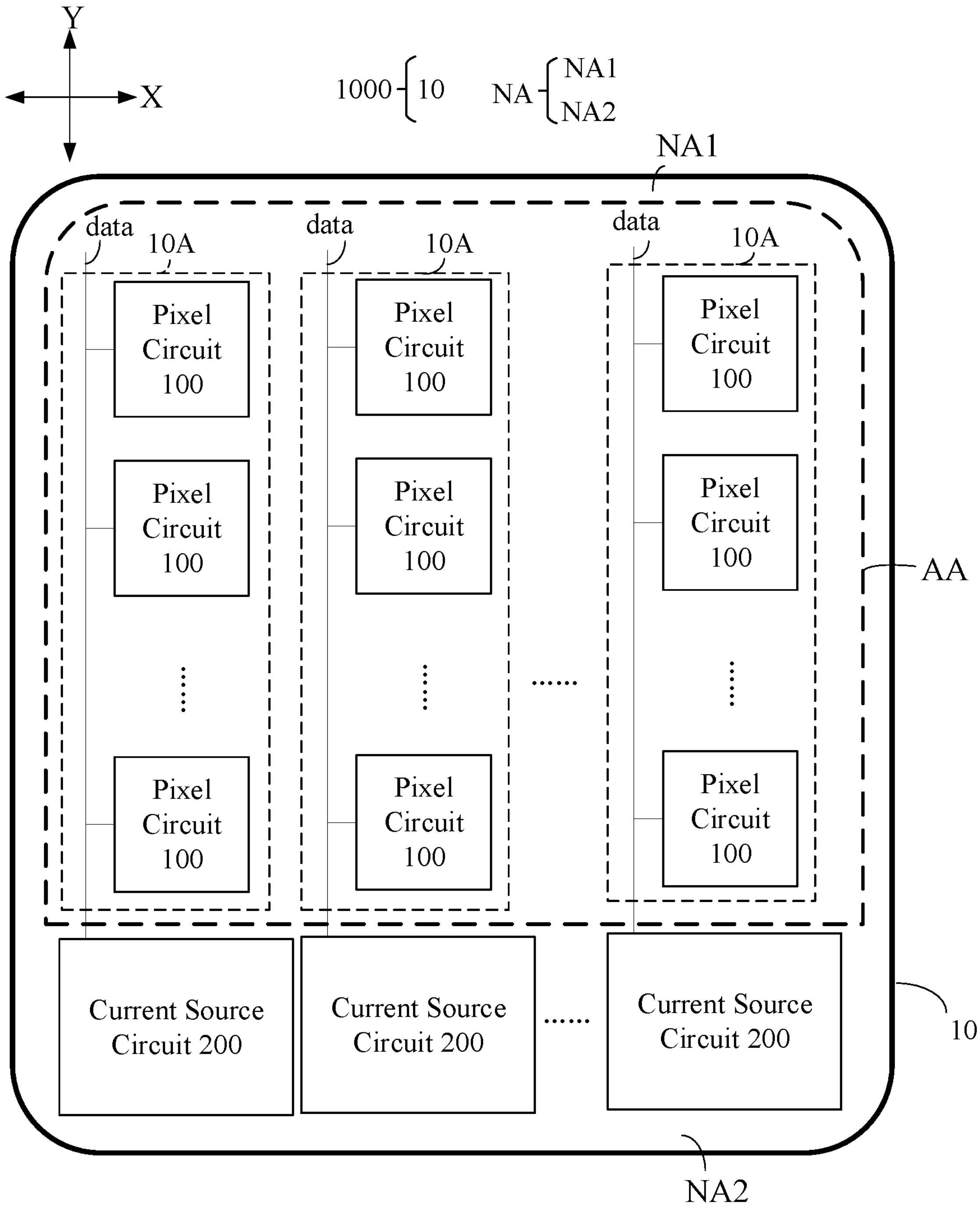
FIG. 18 illustrates another circuit connection diagram of a display module consistent with various embodiments of the present disclosure.

FIG. 18 illustrates another circuit connection diagram of a display module consistent with various embodiments of the present disclosure. As shown in FIG. 18, in some embodiments, optionally, the display panel 10 may include a display area AA and a non-display area NA. The display area AA is arranged with light-emitting elements (not shown), and the display area AA can display images normally. The current source circuits 200 may be in the non-display area NA. In some embodiments, the current source circuits 200 in the non-display area NA may be electrically connected to the pixel circuits 100 in the display area AA.

Therefore, since the current source circuits 200 are in the non-display area NA, the current source circuits 200 can reduce light blocking in the display area AA, thereby ensuring that the display area AA has a higher aperture ratio. It should be noted that the current source circuits 200 can also be in the display area AA, which is not limited herein.

Figure 24:
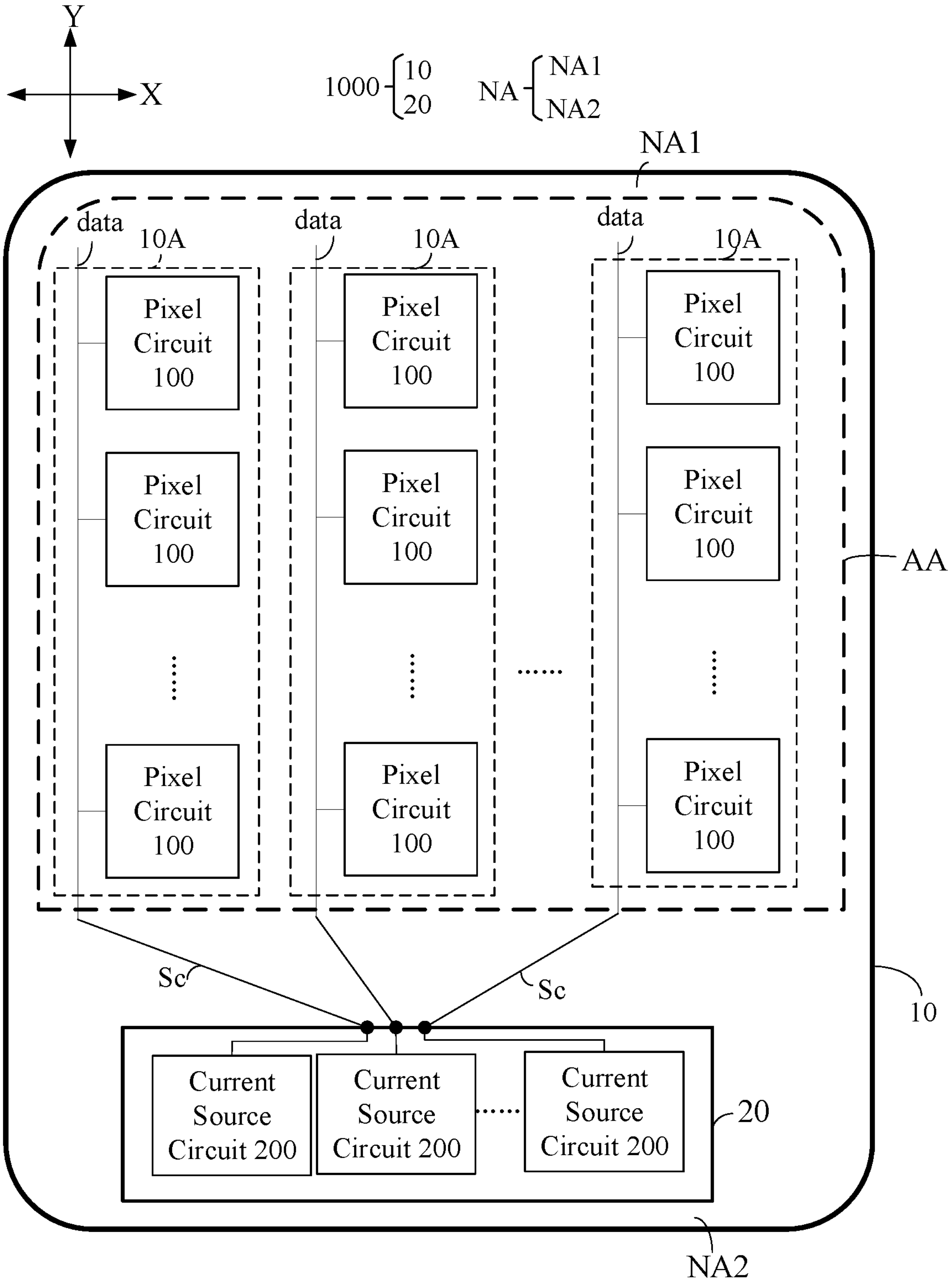
FIG. 24 illustrates another circuit connection diagram of a display module consistent with various embodiments of the present disclosure.

Referring to FIG. 18, in some embodiments, optionally, the non-display area NA may include a first non-display area NA1 and a second non-display area NA2. Along the first direction Y, the first non-display area NA1, the display area AA and the second non-display area NA2 are arranged in sequence, the second non-display area NA2 is arranged with a bonding pad (not shown) for bonding a driver chip or a flexible circuit board. That is, the first non-display area NA1 may be an upper frame of the display panel, and the second non-display area NA2 may be a lower frame of the display panel. The current source circuits 200 may be in the first non-display area NA1 and/or the second non-display area NA2. FIG. 24 shows an example in which a plurality of current source circuits 200 are in the second non-display area NA2. In other embodiments, the plurality of current source circuits 200 can also be in the first non-display area NA1, or one part of the current source circuits 200 is in the first non-display area NA1, and the other part of the current source circuits 200 is in the second non-display area NA2.

As shown in FIG. 18, the plurality of current source circuits 200 in the second non-display area NA2 may be arranged in at least one row along the second direction X. A current source circuit 200 in the second non-display area NA2 may be electrically connected to a plurality of pixel circuits 100 in a pixel circuit group 10A through a data signal line "data". The current source circuit 200 may be used to provide data signals to a plurality of pixel circuits 100 in a pixel circuit group 10A in a time-sharing manner.

Therefore, since the current source circuits 200 are in the second non-display area NA2, the current source circuits 200 can reduce light blocking of the display area AA, thereby ensuring that the display area AA has a higher aperture ratio. In addition, since the second non-display area NA2 is close to a driver chip, arranging the current source circuits 200 in the second non-display area NA2 can facilitate the current source circuits 200 to obtain the control signals from the driver chip, such as current control signals input at the current control signal ends and/or control signals that control on/off states of transistors in the current source circuits 200.

Figure 19:
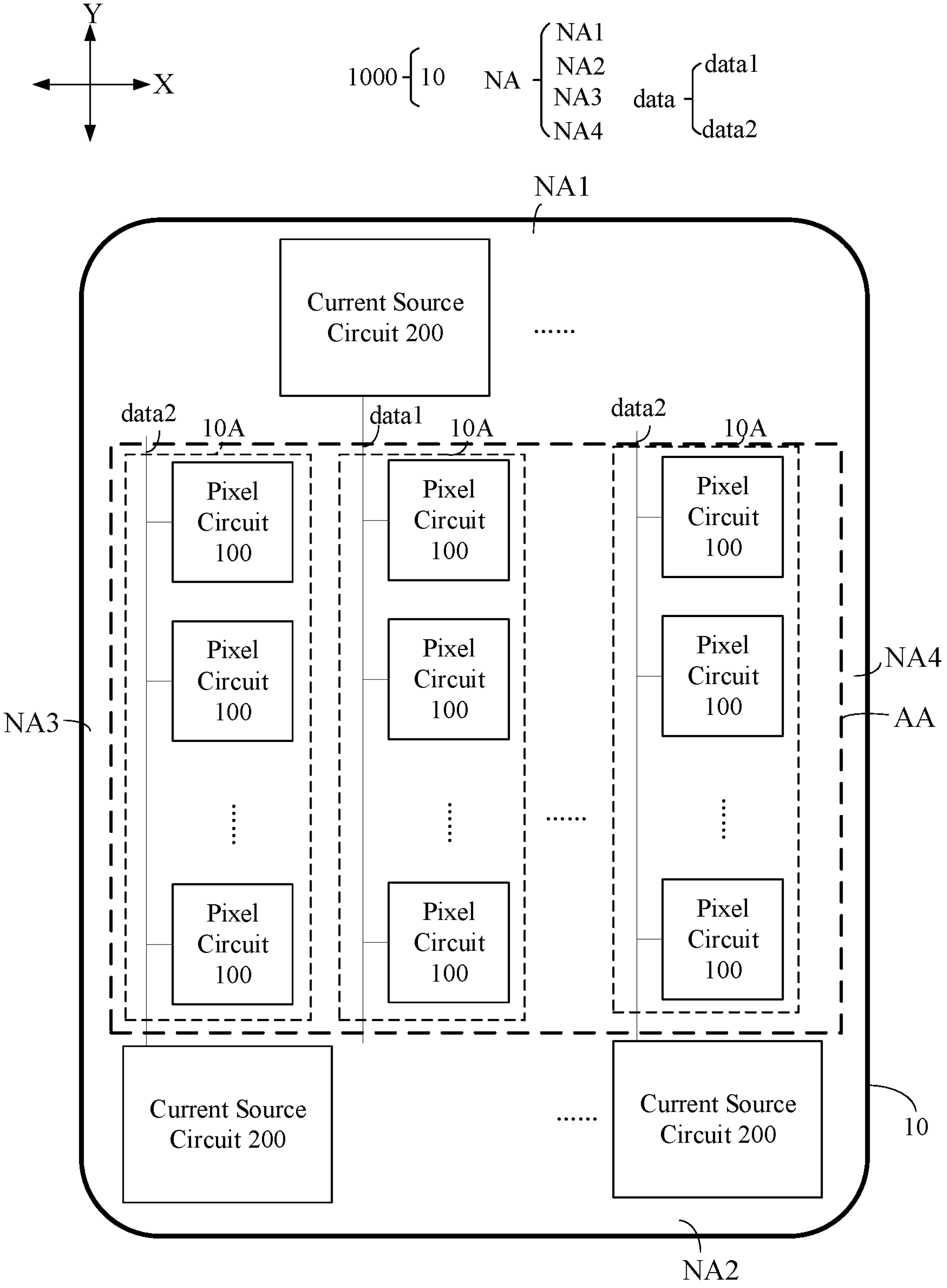
FIG. 19 illustrates another circuit connection diagram of a display module consistent with various embodiments of the present disclosure.

FIG. 19 illustrates another circuit connection diagram of a display module consistent with various embodiments of the present disclosure. As shown in FIG. 19, different from the embodiment shown in FIG. 18, in some embodiments, optionally, among the plurality of current source circuits 200, part of the current source circuits 200 may be in the first non-display area NA1, and the other part of the current source circuits 200 may be in the second non-display area NA2.

The data signal lines "data" may include first data signal lines data1 and second data signal lines data2. A current source circuit 200 in the first non-display area NA1 may be electrically connected to a plurality of pixel circuits 100 in a pixel circuit group 10A through a first data signal line data1, and a current source circuit 200 in the second non-display area NA2 200 may be electrically connected to a plurality of pixel circuits 100 in a pixel circuit group 10A through a second data signal line data2.

Along the second direction X, the first data signal lines data1 and the second data signal lines data2 may be alternately arranged. For example, along the second direction X, odd-numbered pixel circuit groups 10A may be electrically connected to the first data signal lines data1, and even-numbered pixel circuit groups 10A may be electrically connected to the second data signal lines data2. Alternatively, along the second direction X, the even-numbered pixel circuit groups 10A may be electrically connected to the first data signal lines data1, and the odd-numbered pixel circuit groups 10A may be electrically connected to the second data signal lines data2.

Therefore, one part of the current source circuits 200 is in the first non-display area NA1, and the other part of the current source circuits 200 is in the second non-display area NA2. Along the second direction, the first data signal lines data1 and the second data signal lines data2 are alternately arranged. On the one hand, a relatively large distance may exist between two adjacent current source circuits 200 in the first non-display area NA1, so that a relatively large distance exists between two adjacent current source circuits 200 in the second non-display area NA2, thereby effectively preventing a short circuit between two adjacent current source circuits 200. On the other hand, enough space can be utilized to arrange a larger number of current source circuits 200.

Referring to FIG. 19, in some embodiments, optionally, the non-display area NA may include third and fourth non-display areas NA3 and NA4. Along the second direction X, the third non-display area NA3, the display area AA and the fourth non-display area NA4 may be arranged in sequence. That is, the third non-display area NA3 may be a left frame of the display panel, and the fourth non-display area NA4 may be a right frame of the display panel. In other embodiments, a plurality of current source circuits 200 may also be in the third non-display area NA3 and/or the fourth non-display area NA4, which is not limited herein.

Figure 20:
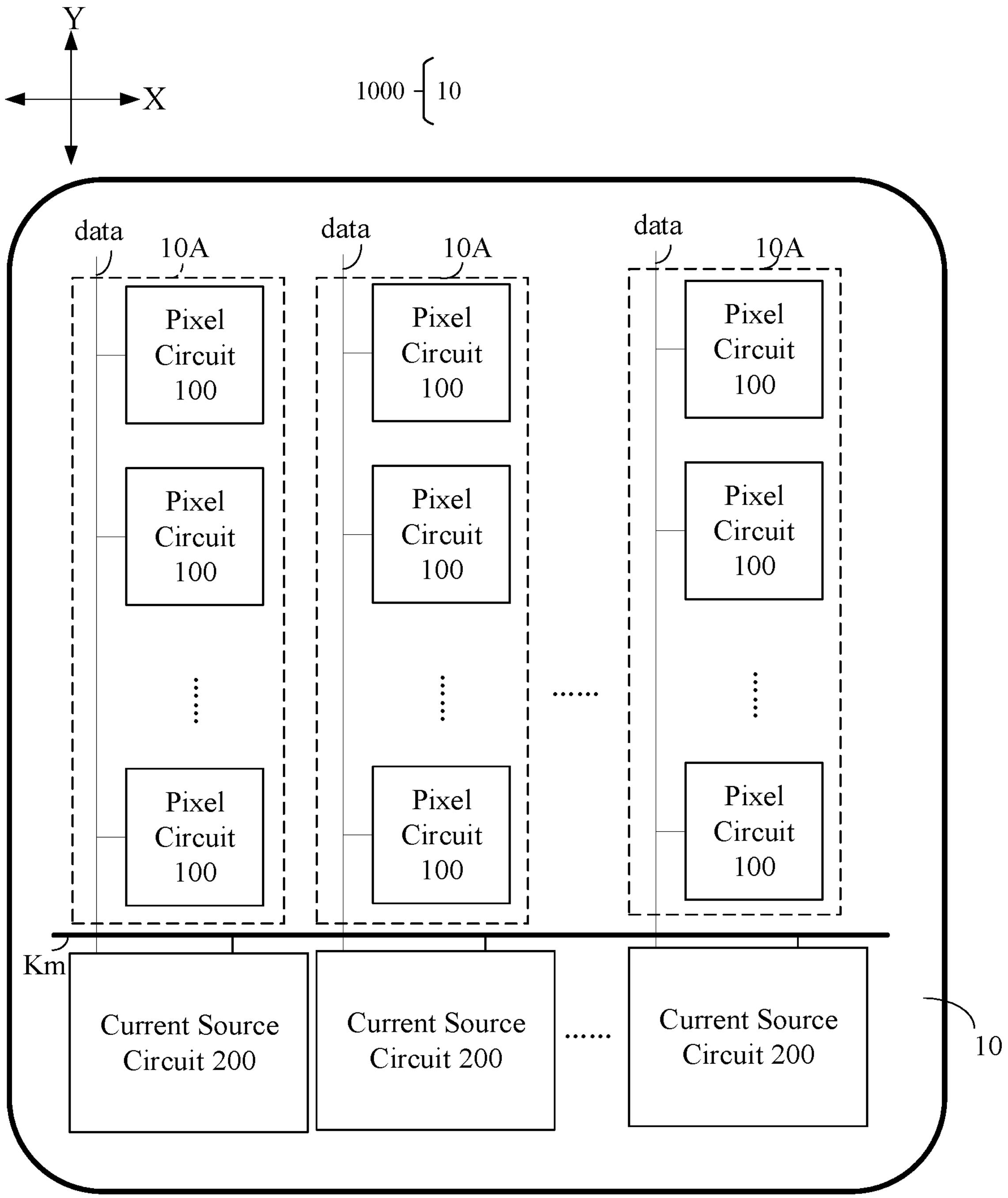
FIG. 20 illustrates another circuit connection diagram of a display module consistent with various embodiments of the present disclosure.

FIG. 20 illustrates another circuit connection diagram of a display module consistent with various embodiments of the present disclosure. As shown in FIG. 20, in some embodiments, optionally, the display module 1000 may include target control signal lines Km, and a plurality of current source circuits 200 may be electrically connected to a same target control signal line Km. The target control signal lines Km can be configured to control operations of the current source circuits 200.

For example, in some embodiments, a plurality of current source circuits 200 may be arranged at intervals along the second direction X. At least part of wiring of the target control signal lines Km may extend along the second direction X and be electrically connected to a plurality of current source circuits 200 spaced apart along the second direction X. The target control signal line Km may supply a target control signal for controlling a transistor in the current source circuit 200 to be turned on/off.

Therefore, in some embodiments, a plurality of current source circuits 200 are electrically connected to a same target control signal line Km. That is, the target control signal line Km can provide target control signals to the plurality of current source circuits 200 at a same time, which is conducive to reducing number of signal lines in the display panel, simplifying the wiring design of the display panel, and reducing costs.

Figure 21:
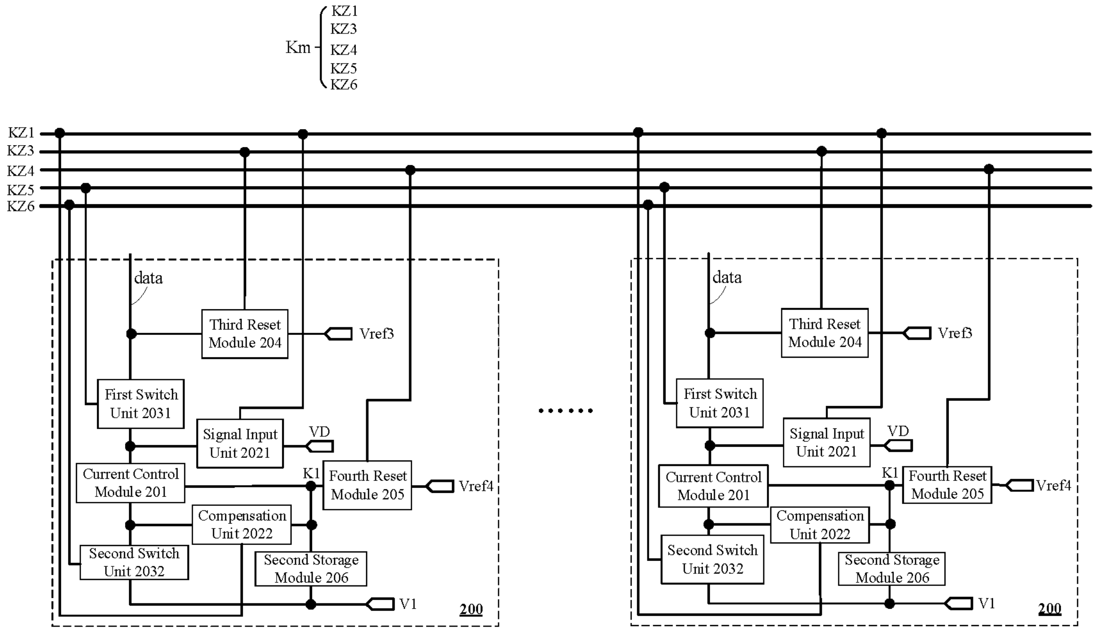
FIG. 21 illustrates a circuit connection diagram of a current source circuit in a display module consistent with various embodiments of the present disclosure.

FIG. 21 illustrates a circuit connection diagram of a current source circuit in a display module consistent with various embodiments of the present disclosure. As shown in FIG. 21, in some embodiments, optionally, a current source circuit includes the signal input unit 2021, the first switch unit 2031, the second switch unit 2032, the third reset module 204 and the fourth reset module 205. The signal input unit 2021 can be electrically connected to the first control signal line KZ1, the third reset module 204 can be electrically connected to the third control signal line KZ3, the fourth reset module 205 can be electrically connected to the fourth control signal line KZ4, the first switch unit 2031 can be electrically connected to the fifth control signal line KZ5, and the second switch unit 2032 can be electrically connected to the sixth control signal line KZ6.

Target control signal lines Km may include the first control signal line KZ1, the third control signal line KZ3, the fourth control signal line KZ4, the fifth control signal line KZ5, and/or the sixth control signal line KZ6. That is, the target control signal lines Km may include at least one of the first control signal line KZ1, the third control signal line KZ3, the fourth control signal line KZ4, the fifth control signal line KZ5, and the sixth control signal line KZ6.

For example, in some embodiments, a first control signal line KZ1 may be electrically connected to control ends of signal input units 2021 in the plurality of current source circuits 200. A first control signal line KZ1 can be configured to provide first control signals at control ends of signal input units 2021 in a plurality of current source circuits 200 and control the signal input units 2021 in the plurality of current source circuits 200 to be turned on/off.

For example, in some examples, a third control signal line KZ3 may be electrically connected to control ends of third reset modules 204 in the plurality of current source circuits 200. A third control signal line KZ3 may be configured to supply third control signals to control ends of third reset module 204 in a plurality of current source circuits 200 and control the third reset modules 204 in the plurality of current source circuits 200 to be turned on/off.

For example, in some embodiments, a fourth control signal line KZ4 may be electrically connected to control ends of fourth reset modules 205 in a plurality of current source circuits 200. A fourth control signal line KZ4 may be configured to supply fourth control signals to control ends of fourth reset modules 205 in a plurality of current source circuits 200 and control the fourth reset modules 205 in the plurality of current source circuits 200 to be turned on/off.

For example, in some embodiments, a fifth control signal line KZ5 may be electrically connected to control ends of first switch units 2031 in a plurality of current source circuits 200. A fifth control signal line KZ5 may be configured to supply fifth control signals to control ends of first switch units 2031 in a plurality of current source circuits 200 and control the first switch units 2031 in the plurality of current source circuits 200 to be turned on/off.

For example, in some embodiments, a sixth control signal line KZ6 may be electrically connected to control ends of second switch units 2032 in a plurality of current source circuits 200. A sixth control signal line KZ6 may be configured to supply sixth control signals to control ends of second switch units 2032 in the plurality of current source circuits 200 and control the second switch units 2032 in the plurality of current source circuits 200 to be turned on/off.

Figure 22:
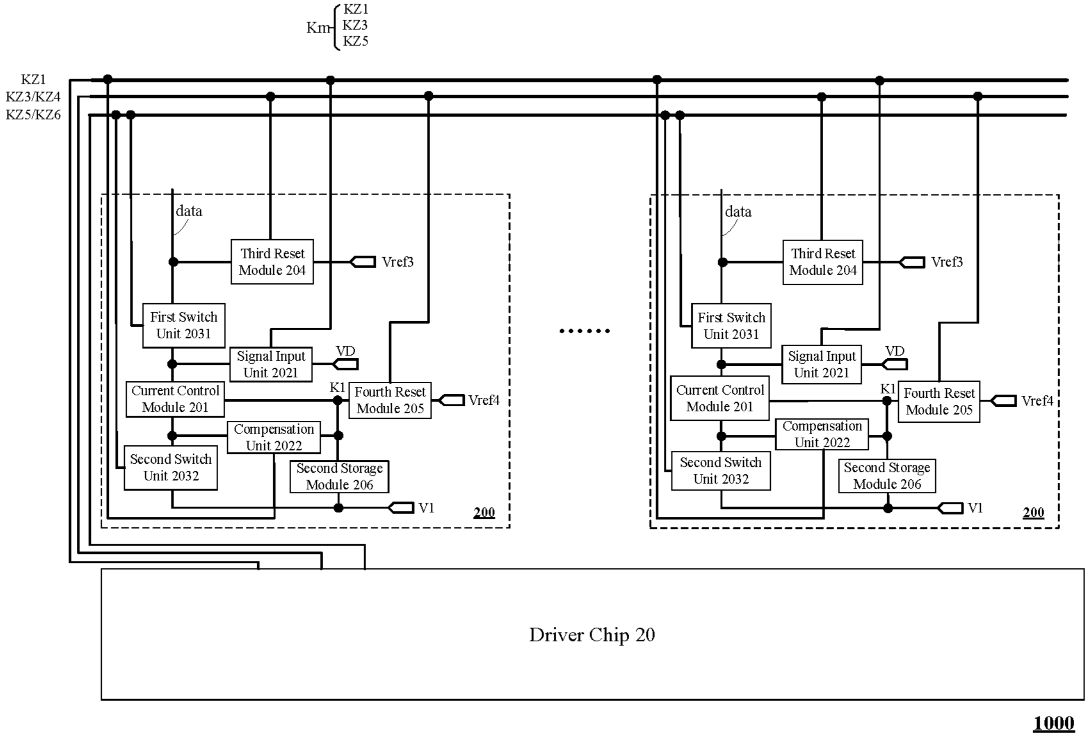
FIG. 22 illustrates another circuit connection diagram of a current source circuit in a display module consistent with various embodiments of the present disclosure.

FIG. 22 illustrates another circuit connection diagram of a current source circuit in a display module consistent with various embodiments of the present disclosure. As shown in FIG. 22, different from the embodiment shown in FIG. 21, in some embodiments, optionally, the third control signal line KZ3 can be multiplexed as the fourth control signal line KZ4, and the fifth control signal line KZ5 can be multiplexed as the sixth control signal line KZ6.

For example, in some embodiments, a third control signal line KZ3 may be electrically connected to control ends of third reset modules 204 and control ends of fourth reset modules 205 in a plurality of current source circuits 200. A third control signal line KZ3 may be configured to supply third control signals to control ends of third reset modules 204 and control ends of fourth reset modules 205 in the plurality of current source circuits 200 and control the third reset modules 204 and the fourth reset modules 205 in the plurality of current source circuits 200 to be turned on/off.

For example, in some embodiments, a fifth control signal line KZ5 may be electrically connected to control ends of first switch units 2031 and control ends of second switch units 2032 in a plurality of current source circuits 200. A fifth control signal line KZ5 may be configured to supply fifth control signals to control ends of first switch units 2031 and control ends of second switch units 2032 in a plurality of current source circuits 200, and control the first switch units 2031 and the second switch units 2032 in the plurality of current source circuits 200 to be turned on/off.

Therefore, the third control signal line KZ3 is multiplexed as the fourth control signal line KZ4, and the fifth control signal line KZ5 is multiplexed as the sixth control signal line KZ6, which is conducive to reducing number of signal lines in the display panel and simplifying the wiring design of the display panel and reduce costs.

Referring to FIG. 22, in some embodiments, optionally, the display module 1000 may also include a driver chip 20. The driver chip 20 may be electrically connected to the first control signal lines KZ1, the third control signal lines KZ3 and the fifth control signal lines KZ5 respectively. The driver chip 20 may be configured to supply a first control signal to the first control signal line KZ1, a third control signal to the third control signal line KZ3, and a fifth control signal to the fifth control signal line KZ5. Therefore, the driver chip 20 supplies control signals including the first, third and fifth control signals, to drive an operation of the current source circuit 200, which can reduce a design of a gate drive circuit in the display panel, save a wiring space of the display panel, and reduce costs.

Figure 23:
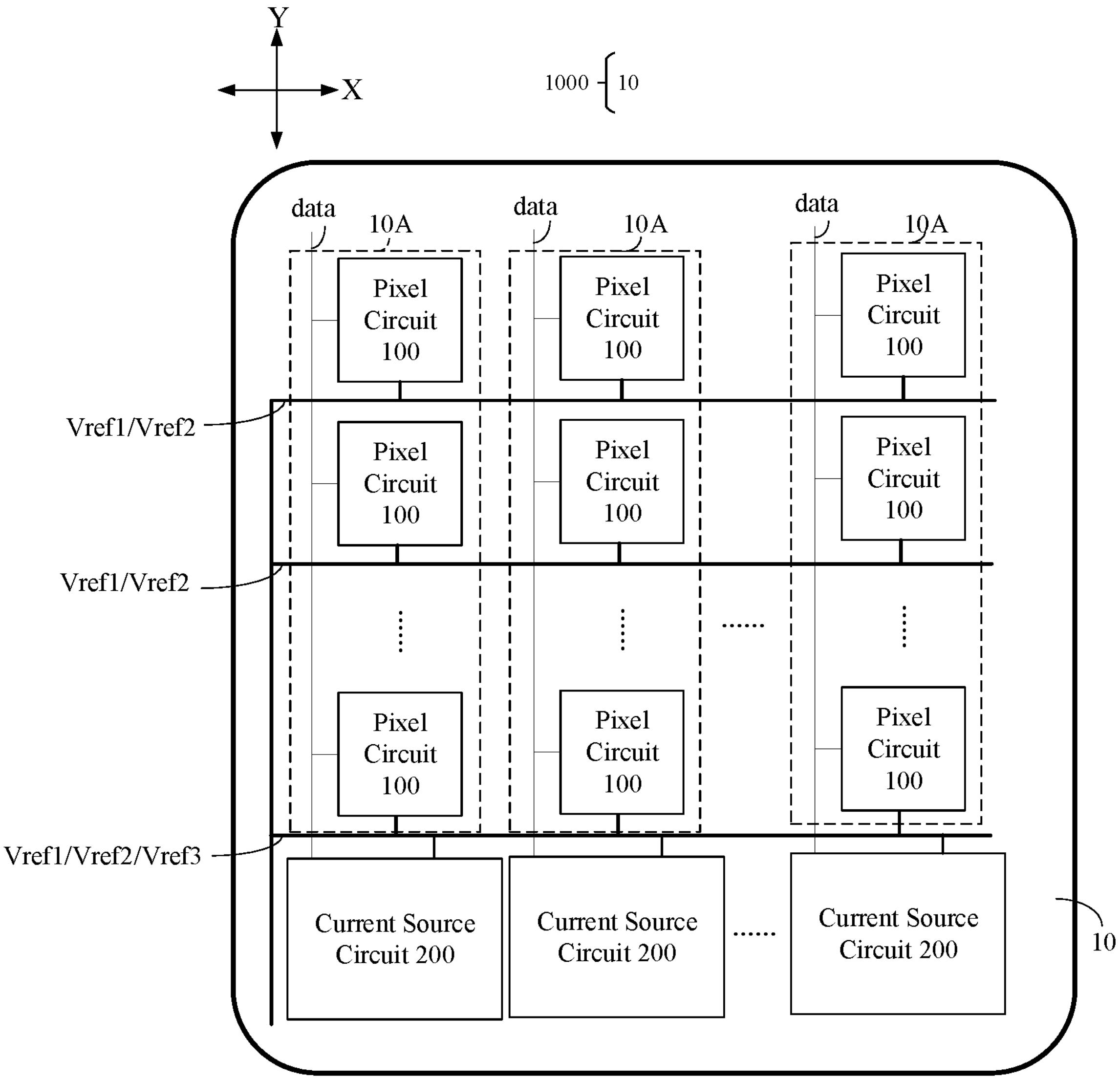
FIG. 23 illustrates another circuit connection diagram of a display module consistent with various embodiments of the present disclosure.

FIG. 23 illustrates another circuit connection diagram of a display module consistent with various embodiments of the present disclosure. As shown in FIG. 23, in some embodiments, optionally, the pixel circuit 100 and the current source circuit 200 may share a same reset signal line. For example, in some embodiments, the third reset signal line Vref3 connected to the current source circuit 200 may be multiplexed as the first reset signal line Vref1, and/or third reset signal line Vref3 connected to the current source circuit 200 may be multiplexed as the second reset signal line Vref2. Therefore, the pixel circuit 100 and the current source circuit 200 multiplex same reset signal lines, which can reduce number of reset signal lines in the display panel, simplify the wiring design of the display panel, and reduce costs.

FIG. 24 illustrates another circuit connection diagram of a display module consistent with various embodiments of the present disclosure. As shown in FIG. 24, in some embodiments, optionally, the display module 1000 may also include the driver chip 20, and the current source circuit 200 may also be on the driver chip 20, which is not limited herein. For example, in some embodiments, the display panel 10 may include the display area AA and the non-display area NA. The display area AA may be arranged with data signal lines "data" and pixel circuits 100, and the non-display area NA may be arranged with fan-out lines Sc. Current source circuits 200 in the driver chip 20 may be electrically connected to the pixel circuits 100 through the fan-out lines Sc and the data signal lines "data" in sequence.

A specific structure and driving timing of the circuit provided in the accompanying drawings of the embodiments are only examples and are not intended to limit the present disclosure. In addition, the above embodiments provided in the present disclosure can be combined with each other without conflict.

It should be understood that each embodiment in the present specification is described in a progressive manner. Same or similar parts between various embodiments can be referred to each other. Each embodiment focuses on differences from other embodiments. According to the above embodiments, the embodiments do not exhaustively describe all the details, nor do they limit the present disclosure to the specific embodiments described. Obviously, many modifications and variations are possible based on the above description. The present specification selects and specifically describes these embodiments to better explain the principles and practical applications of the present application, so that those skilled in the art can make good use of the present application and make modifications based on the present application. The present disclosure is limited only by the claims and their full scope and equivalents.

As disclosed, the pixel circuit, current source circuit and display module provided by the present disclosure at least realize the following beneficial effects.

In the pixel circuit, current source circuit and display module, a data signal line transmits a data signal with a controllable current value to a data writing module in a pixel circuit, which is conducive to adjusting a voltage drop of the data signal from the data signal line, so that a potential of the data signal received by the pixel circuit is same as or close to an expected potential, thereby ensuring a brightness of a light-emitting element driven by the pixel circuit achieves an expected brightness, improving uneven display brightness of a display module, and improving a display effect of the display module. In addition, the data signal in the embodiments of the present disclosure is a data signal with a controllable current value, namely, a current data signal. The current data signal possesses strong anti-interference ability and is conducive to improving display stability.

A person skilled in the art should understand that the above embodiments are illustrative rather than restrictive. Different technical features appearing in different embodiments can be combined to achieve beneficial effects. A person skilled in the art should be able to understand and implement other modified embodiments of the disclosed embodiments based on studying the accompanying drawings, the present specification, and claims. In the claims, the term "comprising" does not exclude other structures. A quantity refers to "one" but does not exclude a plurality. Terms "first" and "second" are used for designation purposes and do not imply a specific order. Any reference signs in the claims shall not be construed as limiting the scope of protection. The presence of certain technical features in different dependent claims does not preclude combining these features to achieve beneficial effects.

What is claimed is:

1. A pixel circuit, comprising:

a first driving branch, connected to a light-emitting element, including a first driving module, a control end of the first driving module being electrically connected to a first node, a first end of the first driving module being electrically connected to a voltage signal line of a first power supply, and a second end of the first driving module being electrically connected to a first electrode of the light-emitting element;

a data writing module, a control end of the data writing module being electrically connected to a first scanning signal line, a first end of the data writing module being electrically connected to a data signal line, a second end of the data writing module being electrically connected to the first node, the data writing module being configured to transmit a data signal from the data signal line to the first node, and the data signal transmitted by the data signal line being a data signal with a controllable current value;

a first reset module, wherein a control end of the first reset module is electrically connected to a third scanning signal line, a first end of the first reset module is electrically connected to a first reset signal line, and a second end of the first reset module is electrically connected to the first electrode of the light-emitting element to reset the first electrode of the light-emitting element;

a second reset module, wherein a control end of the second reset module is electrically connected to a fourth scanning signal line, a first end of the second reset module is electrically connected to a second reset signal line, and a second end of the second reset module is electrically connected to the first node to reset the first node; and a second driving branch, connected to the light-emitting element, the second driving branch including a second driving module, a control end of the second driving module being electrically connected to the first node, a first end of the second driving module being connected to the voltage signal line of the first power supply and a second end of the second driving module being electrically connected to the first electrode of the light emitting element.

2. The pixel circuit according to claim 1, wherein:

the second driving branch further includes a first switch module, a control end of the first switch module is electrically connected to a light-emitting control signal line, a first end of the first switch module is connected to the second end of the second driving module, and a second end of the first switch module is electrically connected to the first electrode of the light emitting element; and the first switch module is configured to be turned off when the data writing module is turned on, and/or the first switch module is configured to be turned on during a light-emitting phase.

3. The pixel circuit according to claim 1, further comprising a second switch module, wherein:

a control end of the second switch module is electrically connected to a second scanning signal line, a first end of the second switch module is electrically connected to the second end of the data writing module, a second end of the second switch module is electrically connected to the first node, and the second switch module is configured to be turned on when the data writing module is turned on.

4. A pixel circuit, comprising:

a first driving branch, connected to a light-emitting element, including a first driving module, a control end of the first driving module being electrically connected to a first node, a first end of the first driving module being electrically connected to a voltage signal line of a first power supply, and a second end of the first driving module being electrically connected to a first electrode of the light-emitting element;

a data writing module, a control end of the data writing module being electrically connected to a first scanning signal line, a first end of the data writing module being electrically connected to a data signal line, a second end of the data writing module being electrically connected to the first node, the data writing module being configured to transmit a data signal from the data signal line to the first node, and the data signal transmitted by the data signal line being a data signal with a controllable current value;

a first reset module, a control end of the first reset module being electrically connected to a third scanning signal line, a first end of the first reset module being electrically connected to a first reset signal line, and a second end of the first reset module being electrically connected to the first electrode of the light-emitting element to reset the first electrode of the light-emitting element; and a second reset module, a control end of the second reset module being electrically connected to a fourth scanning signal line, a first end of the second reset module being electrically connected to a second reset signal line, and a second end of the second reset module being electrically connected to the first node to reset the first node, wherein the data signal line is electrically connected to a current source circuit, the current source circuit provides the data signal to the pixel circuit through the data signal line, and the current source circuit includes:

a current control module, a control end of the current control module being electrically connected to a first control node, a first end of the current control module being electrically connected to a voltage signal line of a third power supply; and a signal input module, electrically connected to a current control signal end and the current control module respectively, and configured to write a current control signal at the current control signal end into the first control node, so that the first control node achieves a target potential, wherein the current control module is turned on under a control of the first control node at the target potential, and outputs an electrical signal driven by a voltage signal of the third power supply provided by the voltage signal end of the third power supply, and the data signal includes the electrical signal with the controllable current value output by the current control module.

5. The pixel circuit according to claim 4, wherein:

the first driving module includes a P-type transistor, and the current control module includes an N-type transistor; or the first driving module includes an N-type transistor, and the current control module includes a P-type transistor.

6. The pixel circuit according to claim 4, wherein the current source circuit further includes:

a third switch module, connected in series with the current control module, and configured to be turned on during a first data writing phase when the current control module outputs the data signal;

a third reset module, a control end of the third reset module being electrically connected to a third control signal line, a first end of the third reset module being electrically connected to a third reset signal line, a second end of the third reset module being electrically connected to the data signal line, and the third reset module being configured to reset the data signal line;

a fourth reset module, a control end of the fourth reset module being electrically connected to a fourth control signal line, a first end of the fourth reset module being electrically connected to a fourth reset signal line, a second end of the fourth reset module being electrically connected to the first control node, and the fourth reset module being configured to reset the first control node; and a second storage module, a first end of the second storage module being electrically connected to the first control node, a second end of the second storage module being electrically connected to the voltage signal line of the third power supply, and the second storage module being configured to maintain a potential of the first control node.

7. The pixel circuit according to claim 6, further comprising a target pixel circuit, wherein:

a period during which the current source circuit supplies a data signal to the target pixel circuit includes a first reset phase, a current control signal writing phase and a first data writing phase arranged in chronological order, a working process of the target pixel circuit includes a second reset phase, a second data writing phase and a light emitting phase arranged in chronological order, and the first data writing phase at least partially overlaps the second data writing phase;

during the first reset phase, the third reset module is turned on, and the third reset module transmits a third reset signal from the third reset signal line to the data signal line, and resets the data signal line, the fourth reset module is turned on, and the fourth reset module transmits a fourth reset signal from the fourth reset signal line to the first control node to reset the first control node;

during the current control signal writing phase, the signal input module is turned on, and the signal input module writes a current control signal at the current control signal end into the first control node, so that the first control node achieves a target potential;

during the first data writing phase, the current control module is turned on under a control of the first control node at the target potential, outputs an electrical signal driven by the voltage signal of the third power supply supplied at the voltage signal end of the third power, and the electrical signal is transmitted to the target pixel circuit through the data signal line, and the data signal includes the electrical signal;

during the second reset phase, the first node in the target pixel circuit is reset;

during the second data writing phase, the data writing module in the target pixel circuit is turned on under a control of the first scanning signal line, and transmits the data signal from the data signal line to the first node; and during the light-emitting phase, the first driving module in the target pixel circuit is turned on, and the first driving branch in the target pixel circuit drives the light-emitting element to emit light.

8. The pixel circuit according to claim 7, wherein:

a starting time of the first data writing phase is earlier than a starting time of the second data writing phase, and a duration of the first data writing phase is longer than a duration of the second data writing phase; and/or an end time of the first data writing phase is later than a start time of the light emitting phase.

9. The pixel circuit according to claim 7, wherein:

the current control signal writing phase at least partially overlaps the second reset phase; and/or a first time interval between the current control signal writing phase and the first data writing phase is less than or equal to a second time interval between the second reset phase and the second data writing phase.

10. A current source circuit, comprising:

a current control module, a control end of the current control module being electrically connected to a first control node, a first end of the current control module being electrically connected to a voltage signal line of a third power supply; and a signal input module, electrically connected to a current control signal end and the current control module respectively, and configured to write a current control signal at the current control signal end into the first control node, so that the first control node achieves a target potential, wherein the current control module is turned on under a control of the first control node at the target potential, and outputs an electrical signal driven by a voltage signal of the third power supply provided by a voltage signal end of the third power supply, and the data signal includes the electrical signal with a controllable current value output by the current control module; and wherein the current source circuit further includes:

a third switch module, connected in series with the current control module, and configured to be turned on during a first data writing phase when the current control module outputs the data signal;

a third reset module, a control end of the third reset module being electrically connected to a third control signal line, a first end of the third reset module being electrically connected to a third reset signal line, a second end of the third reset module being electrically connected to the data signal line, and the third reset module being configured to reset the data signal line;

a fourth reset module, a control end of the fourth reset module being electrically connected to a fourth control signal line, a first end of the fourth reset module being electrically connected to a fourth reset signal line, a second end of the fourth reset module being electrically connected to the first control node, and the fourth reset module being configured to reset the first control node; and a second storage module, a first end of the second storage module being electrically connected to the first control node, a second end of the second storage module being electrically connected to the voltage signal line of the third power supply, and the second storage module being configured to maintain a potential of the first control node.

11. A display module comprising:

a plurality of data signal lines, extending along a first direction and arranged at intervals along a second direction, the first direction intersecting the second direction; and a plurality of current source circuits and a plurality of pixel circuit groups spaced apart along the second direction, a pixel circuit group of the plurality of pixel circuit groups including a plurality of pixel circuits spaced apart along the first direction, wherein a current source circuit of the plurality of current source circuits is electrically connected to the plurality of pixel circuits in a pixel circuit group of the plurality of pixel circuit groups through a data signal line of the plurality of data signal lines, and a current source circuit of the plurality of current source circuits is configured to supply data signals to the plurality of pixel circuits in a pixel circuit group of the plurality of pixel circuit groups;

wherein:

a pixel circuit of the pixel circuits includes:

a first driving branch, connected to a light-emitting element, including a first driving module, a control end of the first driving module being electrically connected to a first node, a first end of the first driving module being electrically connected to a voltage signal line of a first power supply, and a second end of the first driving module being electrically connected to a first electrode of a light-emitting element, and a data writing module, a control end of the data writing module being electrically connected to a first scanning signal line, a first end of the data writing module being electrically connected to a data signal line, a second end of the data writing module being electrically connected to the first node, and the data writing module being configured to transmit a data signal from the data signal line to the first node, and the data signal transmitted by the data signal line being a data signal with a controllable current value; and a current source circuit of the current source circuits includes:

a current control module, a control end of the current control module being electrically connected to a first control node, a first end of the current control module being electrically connected to a voltage signal line of a third power supply, and a signal input module, electrically connected to a current control signal end and the current control module respectively, and configured to write a current control signal at the current control signal end into the first control node, so that the first control node achieves a target potential, wherein the current control module is turned on under a control of the first control node at the target potential, and outputs an electrical signal driven by the voltage signal of the third power supply provided by a voltage signal end of the third power supply, the data signal includes an electrical signal with a controllable current value output by the current control module; and the current source circuit supplies a data signal to the pixel circuit through a data signal line;

wherein the display module further comprises target control signal lines, the plurality of current source circuits is electrically connected to a same target control signal line, and the same target control signal line is configured to control an operation of the plurality of the current source circuits; and wherein the current source circuit includes a signal input unit, a first switch unit, a second switch unit, a third reset module and a fourth reset module, the signal input unit is electrically connected to a first control signal line, the third reset module is electrically connected to a third control signal line, the fourth reset module is electrically connected to a fourth control signal line, and the first switch unit is electrically connected to a fifth control signal line, and the second switch unit is electrically connected to a sixth control signal line; and the target control signal lines include the first control signal line, the third control signal line, the fourth control signal line, the fifth control signal line and/or the sixth control signal line.

12. The display module according to claim 11, wherein the current source circuit of a plurality of current source circuits is configured to sequentially supply the data signals to a plurality of pixel circuits in a pixel circuit group in a time-sharing manner according to an arrangement order of the plurality of pixel circuits in the pixel circuit group.

13. The display module according to claim 11, further comprising a display panel and a driver chip, wherein:

the display panel includes the pixel circuits and the current source circuits, or the display panel includes the pixel circuits, and the driving chip includes the current source circuits.

14. The display module according to claim 11, further comprising a display panel, wherein:

the display panel includes a display area and a non-display area, the display area is arranged with light-emitting elements, and the current source circuits are in the non-display area.

15. The display module according to claim 14, wherein:

the display panel includes the plurality of data signal lines;

the non-display area includes a first non-display area and a second non-display area, along the first direction, the first non-display area, the display area and the second non-display area are arranged in sequence, and the second non-display area is provided with a bonding pad for bonding a driver chip or a flexible circuit board; and the current source circuits are in the first non-display area and/or the second non-display area.

16. The display module according to claim 11, wherein the pixel circuit and the current source circuit share a same reset signal line.

17. A pixel circuit, comprising:

a first driving branch, connected to a light-emitting element, including a first driving module, a control end of the first driving module being electrically connected to a first node, a first end of the first driving module being electrically connected to a voltage signal line of a first power supply, and a second end of the first driving module being electrically connected to a first electrode of the light-emitting element; and a data writing module, a control end of the data writing module being electrically connected to a first scanning signal line, a first end of the data writing module being electrically connected to a data signal line, a second end of the data writing module being electrically connected to the first node, the data writing module being configured to transmit a data signal from the data signal line to the first node, and the data signal transmitted by the data signal line being a data signal with a controllable current value, wherein the data signal line is electrically connected to a current source circuit, the current source circuit provides the data signal to the pixel circuit through the data signal line, and the current source circuit includes:

a current control module, a control end of the current control module being electrically connected to a first control node, a first end of the current control module being electrically connected to a voltage signal line of a third power supply; and a signal input module, electrically connected to a current control signal end and the current control module respectively, and configured to write a current control signal at the current control signal end into the first control node, so that the first control node achieves a target potential, wherein the current control module is turned on under a control of the first control node at the target potential, and outputs an electrical signal driven by a voltage signal of the third power supply provided by the voltage signal end of the third power supply, and the data signal includes the electrical signal with a controllable current value output by the current control module, and wherein the current source circuit further includes:

a third switch module, connected in series with the current control module, and configured to be turned on during a first data writing phase when the current control module outputs the data signal;

a third reset module, a control end of the third reset module being electrically connected to a third control signal line, a first end of the third reset module being electrically connected to a third reset signal line, a second end of the third reset module being electrically connected to the data signal line, and the third reset module being configured to reset the data signal line;

a fourth reset module, a control end of the fourth reset module being electrically connected to a fourth control signal line, a first end of the fourth reset module being electrically connected to a fourth reset signal line, a second end of the fourth reset module being electrically connected to the first control node, and the fourth reset module being configured to reset the first control node; and a second storage module, a first end of the second storage module being electrically connected to the first control node, a second end of the second storage module being electrically connected to the voltage signal line of the third power supply, and the second storage module being configured to maintain a potential of the first control node.

* * * * *